(12) United States Patent
Hiraguchi

(10) Patent No.: US 7,261,249 B2
(45) Date of Patent: Aug. 28, 2007

(54) TAPE CARTRIDGE

(75) Inventor: Kazuo Hiraguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 211 days.

(21) Appl. No.: 10/849,139

(22) Filed: May 20, 2004

(65) Prior Publication Data

US 2004/0232266 A1 Nov. 25, 2004

(30) Foreign Application Priority Data

May 21, 2003 (JP) .............................. 2003-143879

(51) Int. Cl.
*G11B 23/107* (2006.01)
(52) U.S. Cl. .................................... 242/338.1; 242/348
(58) Field of Classification Search ............. 242/338.1, 242/338.3, 348, 348.2, 343; 360/132; 29/806
See application file for complete search history.

(56) References Cited

U.S. PATENT DOCUMENTS

| | | | |
|---|---|---|---|
| 5,199,661 A * | 4/1993 | Gelardi et al. ........... 242/345.2 |
| 5,901,916 A | 5/1999 | McAllister et al. | |
| 6,315,230 B1 * | 11/2001 | Hansen et al. ............... 242/348 |
| 6,452,748 B1 * | 9/2002 | Shima et al. ................ 360/132 |
| 6,480,357 B1 * | 11/2002 | Rambosek .................. 360/132 |
| 6,728,066 B2 * | 4/2004 | Morita et al. ............... 360/132 |
| 6,736,344 B2 * | 5/2004 | Tsuyuki et al. .......... 242/338.1 |
| 2002/0158161 A1 * | 10/2002 | Morita et al. ............ 242/338.1 |
| 2002/0175239 A1 * | 11/2002 | Momoi et al. .............. 242/348 |

FOREIGN PATENT DOCUMENTS

| | | |
|---|---|---|
| JP | 11-273307 A | 10/1999 |
| JP | 2000-339909 A | 12/2000 |
| JP | 2002-197833 A | 7/2002 |

* cited by examiner

*Primary Examiner*—Gene O. Crawford
*Assistant Examiner*—Scott Haugland
(74) *Attorney, Agent, or Firm*—Sughrue Mion, PLLC

(57) ABSTRACT

A recording tape cartridge which, with a structure having good produceability, can prevent wear of regions of abutment of a braking member and a releasing member at a time when a reel rotates. In the recording tape cartridge, when the braking member is positioned at a rotation locking position at which the braking member is engaged with an engaging gear provided at a floor portion of a reel hub, rotation of the reel, which is accommodated within a case, with respect to the case is impeded. When the braking member is held at a rotation permitting position at which engagement is released while the braking member abuts a clutch member, rotation of the reel with respect to the case is permitted. The braking member and the clutch member are respectively formed by resin molding, and abut one another at a slide-contact projection which is a resin portion, and a metal plate which is fixed to a clutch main body by caulking.

11 Claims, 22 Drawing Sheets

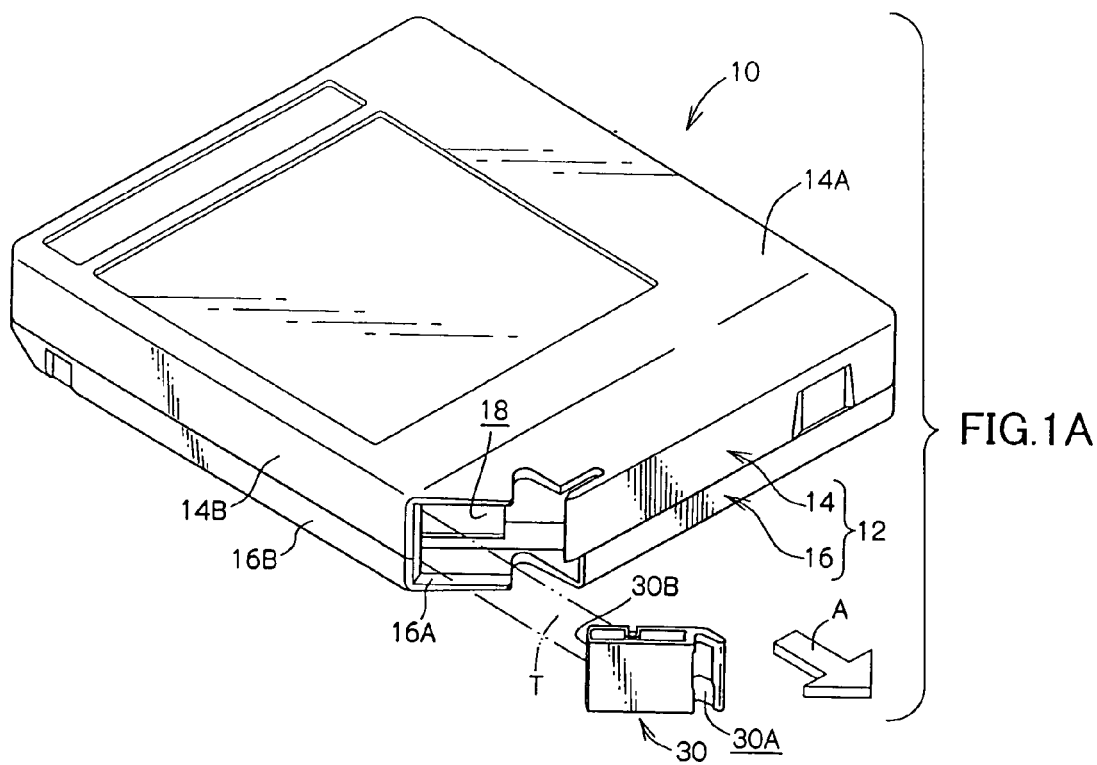
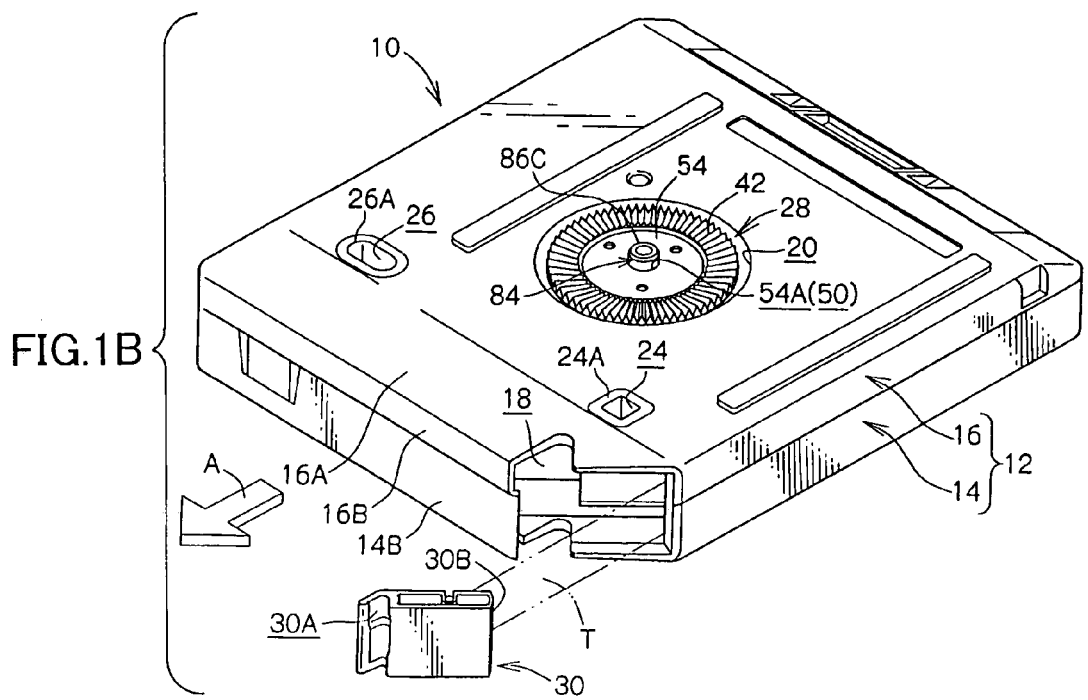

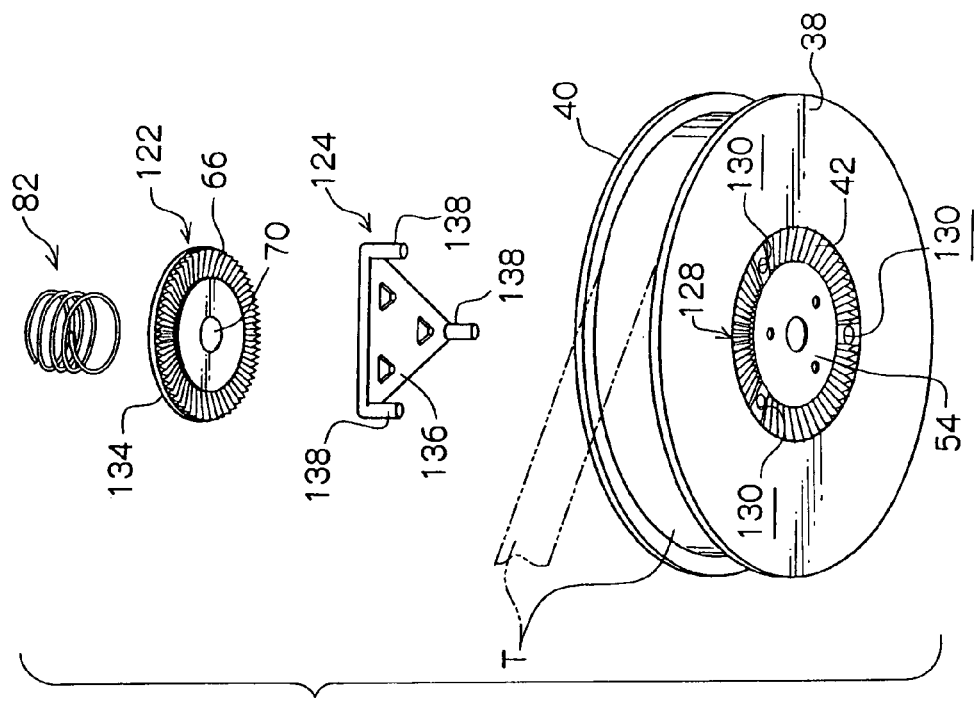
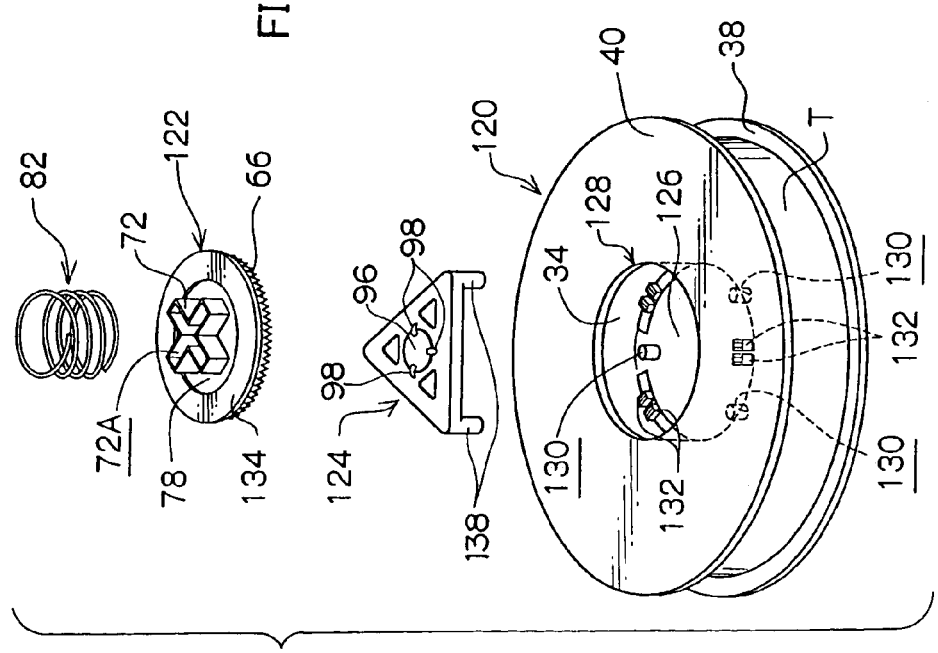
FIG. 14A
FIG. 14B

TAPE CARTRIDGE

CROSS-REFERENCE TO RELATED APPLICATION

This application claims priority under 35USC 119 from Japanese Patent Application No. 2003-143879, the disclosure of which is incorporated by reference herein.

BACKGROUND OF THE INVENTION

1. Field of the Invention

The present invention relates to a tape cartridge which rotatably accommodates a reel on which a recording tape, such as a magnetic tape or the like, is wound.

2. Description of the Related Art

Recording tapes such as magnetic tapes and the like are used as external recording media for computers and the like. Little space is required to accommodate such a recording tape at the time of storage thereof, and a large amount of information can be recorded thereon. A so-called single-reel recording tape cartridge is used in which a single reel, on which the recording tape is wound, is rotatably accommodated within a case.

Such a recording tape cartridge is provided with a braking means so that the reel does not rotate within the case at times when the recording tape cartridge is not being used (see Japanese Patent No. 3187022 for example). A recording tape cartridge equipped with such a braking means will be described on the basis of FIGS. 22 and 23.

In a recording tape cartridge 200 illustrated in FIG. 22, a single reel 204 is accommodated within a case 202. The case 202 has a gear opening 206 provided at the central portion of a floor plate 202A, and a rotation restricting rib 208 projecting downwardly from a ceiling plate 202B.

The reel 204 has a reel hub 210 which is formed in the shape of a hollow cylinder having a bottom, and around whose outer peripheral portion a recording tape is wound. A reel gear 214, which can mesh with a driving gear 212A formed at a rotating shaft 212 of a drive device, is formed in an annular form at the bottom surface of a floor portion 210A of the reel hub 210. Insert-through holes 216, which pass through the floor portion 210A, are provided at a plurality of positions spaced apart at uniform intervals on a circumference at the region where the reel gear 214 is formed. On the other hand, anchor projections 218 stand erect at the top surface of the floor portion 210A from plural places which are between the respective through holes 216 and are along a predetermined circumference (i.e., the anchor projections 218 are provided discretely). A gear tooth 218A is formed at the top end portion of each anchor projection 218.

A disc-shaped braking member 220 is provided so as to be inserted within the reel hub 210. A braking gear 220A, which is annular and which can mesh with the gear teeth 218A, is provided at the bottom surface of the braking member 220. The rotation restricting rib 208 of the case 202 is inserted in an insertion groove 222A of a projection 222, which stands erect from the top surface of the braking member 220, such that the braking member 220 cannot rotate with respect to the case 202 but can move upward and downward. Further, a compression coil spring 224 is disposed between the braking member 220 and the ceiling plate 202B of the case 202. There is usually a rotation locked state in which rotation of the reel 204 with respect to the case 202 is impeded due to the braking gear 220A of the braking member 220 meshing with the gear teeth 218A due to the urging force of the compression coil spring 224.

A releasing member 226 is disposed between the braking member 220 and the floor portion 210A of the reel hub 210, so as to abut each of the braking member 220 and the floor portion 210A. The releasing member 226 is formed in the shape of a plate which is substantially triangular as seen in plan view, so as to not interfere with the anchor projections 218. Leg portions 226A, which stand erect from the vertices of this substantially triangular plate, are inserted in the insert-through holes 216 of the reel 204.

When the leg portions 226A of the releasing member 226 are pushed by the driving gear 212A due to the operation of the driving gear 212A meshing with the reel gear 214, as shown in FIG. 23, the releasing member 226 is pushed up against the urging force of the compression coil spring 224 and pushes the braking member 220 upward. In this way, the meshing of the braking gear 220A and the gear teeth 218A, i.e., the state in which rotation of the reel 204 is locked, is released. In the state in which the meshing of the driving gear 212A and the reel gear 214 is maintained (i.e., in the state shown in FIG. 23), the releasing member 226 holds the braking member 220 at this released position.

When the rotating shaft 212 rotates, the reel 204 rotates within the case 202. At this time, the releasing member 226, whose leg portions 226A are inserted in the insert-through holes 216 of the reel 204, rotates integrally with the reel 204. A convex portion 226B, which is provided at the axially central portion of the releasing member 226, slidingly-contacts, in a state in which there is point-contact, a convex portion 220B which is provided at the axially central portion of the braking member 220 which cannot rotate with respect to the case 202. Note that both the braking member 220 and the releasing member 226 are formed by resin molding, and the complex configurations thereof can be easily obtained.

However, in recent years, higher recording densities have come to be required of the recording tape cartridge 200. In order to address such a requirement, it has been thought to make the recording tape more thin so as to increase the amount thereof which can be wound onto the reel 204. Further, accompanying the increase in speed of writing information onto the recording tape and reading information recorded on the recording tape, increasing the speed of the pulling-out of the recording tape (the feeding speed) has been considered. For these reasons, the recording tape cartridge 200 must be able to handle an increase in the time over which the reel 204 is continuously rotated, and an increase in the rotating speed of the reel 204.

However, in the above-described conventional recording tape cartridge 200, when the reel 204 rotates, the convex portion 220B of the braking member 220 which is made of resin, and the convex portion 226B of the releasing member 226 which is also made of resin, slidingly-contact one another. Therefore, if the rotational speed of the reel 204 is high (e.g., the speed of feeding the recording tape is 6 m/s or more) and such rotation is carried out over a long period of time, there is the concern that the convex portion 220B or the convex portion 226B will become worn or will melt. If the height of the convex portion 220B or the convex portion 226B becomes short due to such wear or the like, the meshing of the braking gear 220A of the braking member 220 and the gear teeth 218A of the reel 204 cannot be properly released within the stroke of movement of the rotating shaft 212.

Thus, in order to prevent wear between the braking member 220 and the releasing member 226, various conventional measures have been proposed. (Refer to Japanese Patent Applications Laid-Open (JP-A) Nos. 11-273307, 2002-197833, and 2000-339909).

JP-A No. 11-273307 discloses a recording tape cartridge in which the region of the releasing member 226, which region slidingly-contacts the convex portion 220B, is formed by a metal plate. This metal plate is fixedly mounted to the releasing member 226 by insert molding or adhesion.

JP-A No. 2002-197833 discloses a recording tape cartridge in which the region of one of the braking member 220 and the releasing member 226, which region slidingly-contacts the other of the braking member 220 and the releasing member 226, is formed by a metal member. This metal member is fixedly mounted to the one of the releasing member 226 and the braking member 220 by being fit therein or by being adhered thereto.

JP-A No. 2000-339909 discloses a structure in which a sheet member, which slides well, is interposed at the region of abutment between the braking member 220 and the releasing member 226. Specifically, this sheet member is adhered by an adhesive to the releasing member 226, and is made to slidingly-contact the convex portion 220B of the braking member 220.

In each of the aforementioned conventional structures, certain effects are obtained as countermeasures to the problem of wear between the braking member and the releasing member. However, there are the following drawbacks.

In the structure disclosed in JP-A No. 11-273307, because the metal plate also functions to reinforce the releasing member and aim for thinness, the metal plate must be provided over the entire surface of the releasing member. In a case in which the metal plate is fixed to the releasing member by insert molding, with merely a flat-plate-shaped metal plate, the strength of attachment is weak, and there is the concern that the metal plate may fall off of the releasing member due to a shock (the impact of a drop) at the time when the recording tape cartridge is dropped. Therefore, usually, in the case of insert molding, claw portions, which are embedded in the resin portion, are formed at the peripheral edge portion of the metal plate. However, the number of pressing processes for shaping the metal plate increases due to the formation of these claw portions (i.e., a bending process after punching is needed). Moreover, due to the need to make the releasing member thin, the claw portions of the metal plate are embedded in (the vicinities of) the regions where the leg portions 226A are formed. The positioning of the metal plate (the claw portions) with respect to the fixed mold used for insert molding (the leg portion 226A molding regions) is therefore complicated. For these reasons, the attaching of the metal plate to the releasing member by insert molding results in poor produceability. Moreover, in a case in which the metal plate is fixed to the releasing member by adhesion, the product yield is poor because, generally, it is difficult to adhere, by an adhesive, a material having good slidability, or the adhesiveness thereof is poor. Namely, produceability is poor also when the metal plate is attached to the releasing member by adhesion.

In the structure disclosed in JP-A No. 2002-197833, with respect to the case of using adhesion, the produceability is poor in the same way as in JP-A No. 11-273307. On the other hand, when a metal member is fixed to the releasing member or the like by fitting, claw portions for engagement, which are formed so as to be bent in a substantial V-shape from the peripheral edge portion of the flat-plate-shaped metal member, are provided so as to extend out, and fitting is carried out by these claw portions for engagement being inserted into holes for engagement, which are formed in the releasing member, while the claw portions for engagement deform. Therefore, in the same way as with the metal plate of JP-A No. 11-273307, the number of pressing processes for shaping the metal member increases (in particular, a bending process is added). Further, because the metal member is a relatively compact part, it is difficult to ensure dimensional stability due to the pressing processes. When the dimensional accuracy (the machining accuracy) of the claw portions for engagement deteriorates, it is difficult to insert the claw portions for engagement into the holes for engagement, or it is easy for the metal member to fall off of the releasing member due to the impact of a drop. Therefore, the product yield of the metal member, of which high dimensional accuracy is required, deteriorates. For these reasons, attachment of the metal member to the releasing member by fitting results in poor produceability.

In the structure disclosed in JP-A No. 2000-339909, the sheet member, which has good slidability, is fixed to the releasing member by adhesion. Therefore, in the same way as in the above-described case of the metal plate and the like, adhesion by an adhesive is difficult or the adhesiveness is poor, and the product yield is poor. In particular, because it is easy for warping or strain to arise at the sheet member due to the mechanical properties thereof (such as the sheet member being thin and having low rigidity, or the like), adhesion by an adhesive is even more difficult.

SUMMARY OF THE INVENTION

In view of the aforementioned, an object of the present invention is to provide a tape cartridge which, with a structure having good produceability, can prevent wear of regions of abutment of a braking member and a releasing member at the time when a reel rotates.

In order to achieve the above object, in accordance with a first aspect of the present invention, there is provided a tape cartridge comprising: a reel; a braking member formed of resin and able to move reciprocatingly at least between a locking position at which the braking member prohibits rotation of the reel, and an unlocking position at which the braking member permits rotation of the reel; a releasing member formed of resin and able to engage with the braking member for the reciprocating movement; and a metal plate positioned between the braking member and the releasing member, and fixed to one of the braking member and the releasing member by a portion of the one of the braking member and the releasing member being caulked (crimped), and having an abutment surface which can abut another of the braking member and the releasing member.

The foregoing, and other objects, features and advantages of the present invention will be apparent from the following description of preferred embodiments of the invention as illustrated in the accompanying drawings, and the accompanying claims.

BRIEF DESCRIPTION OF THE DRAWINGS

FIGS. 1A and 1B are drawings illustrating the external appearance of a recording tape cartridge relating to an embodiment of the present invention, where FIG. 1A is a perspective view as seen from above and FIG. 1B is a perspective view as seen from below.

FIG. 9A is a plan view and FIG. 9B is a sectional view.

FIG. 10A is an exploded perspective view and FIG. 10B is a perspective view of an assembled state.

FIG. 11A is a sectional view before caulking and FIG. 11B is a sectional view after caulking.

FIGS. 14A and 14B are drawings showing a reel and a braking means which relate to a first modified example and which structure the recording tape cartridge relating to the embodiment of the present invention, where FIG. 14A is an exploded perspective view as seen from above and FIG. 14B is an exploded perspective view as seen from below.

FIG. 15A is an enlarged sectional view of main portions at a time when rotation of the reel is locked and FIG. 15B is an enlarged sectional view of main portions at a time when locking of rotation of the reel is released.

FIG. 16A is an enlarged sectional view of main portions at a time when rotation of the reel is locked and FIG. 16B is an enlarged sectional view of main portions at a time when locking of rotation of the reel is released.

FIG. 19A is a sectional view showing a through hole and FIG. 19B is a sectional view showing the through hole through which a projection for caulking is inserted.

FIG. 20A is an exploded perspective view and FIG. 20B is a perspective view of an assembled state.

FIG. 21A is a sectional view before caulking and FIG. 21B is a sectional view after caulking.

DETAILED DESCRIPTION OF THE INVENTION

A recording tape cartridge 10 relating to an embodiment of the present invention will be described on the basis of FIGS. 1A through 13.

Figure 2:
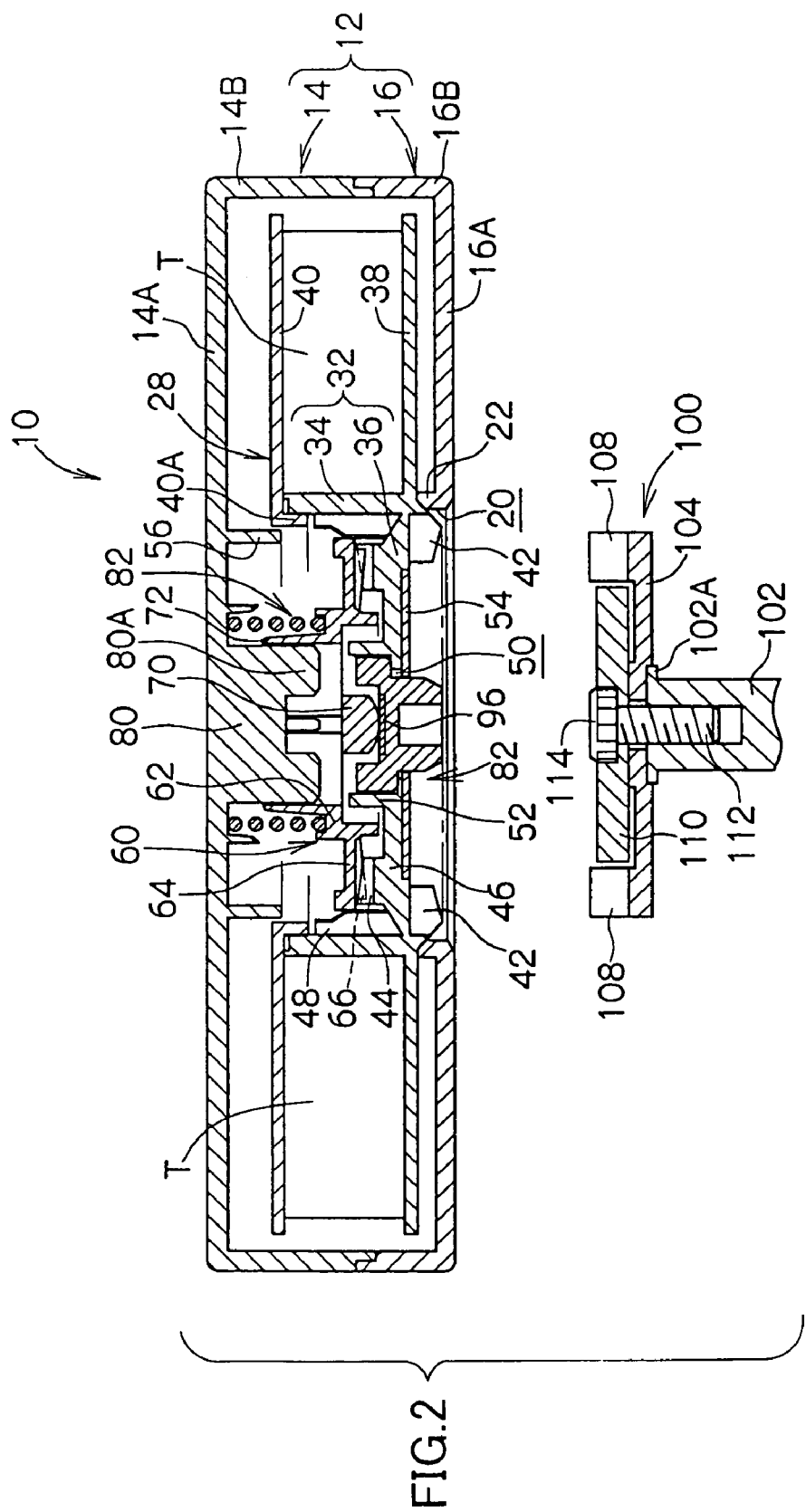
FIG. 2 is a sectional view at a time when rotation of a reel is locked in the recording tape cartridge relating to the embodiment of the present invention.

A perspective view in which the recording tape cartridge 10 is viewed from above and at an incline is shown in FIG. 1A. A perspective view in which the recording tape cartridge 10 is viewed from below and at an incline is shown in FIG. 1B. A sectional view of the recording tape cartridge 10 is shown in FIG. 2. Note that arrow A used in FIGS. 1A and 1B indicates the direction of loading the recording tape cartridge 10 into a drive device, and for convenience of explanation, the side in the direction of arrow A is the front side.

As shown in these drawings, the recording tape cartridge 10 has a case 12. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed in a substantial box shape by the upper case 14 and the lower case 16 being joined together by ultrasonic welding or screws or the like in a state in which the open end of the peripheral wall 14B and the open end of the peripheral wall 16B abut one another.

At a corner portion of the case 12 at the leading side in the direction of loading the recording tape cartridge 10 into a drive device, the ceiling plate 14A, the peripheral wall 14B, the floor plate 16A and the peripheral wall 16B are respectively cut away, such that an opening 18, which is inclined with respect to the loading direction, is formed. A gear opening 20, which is circular and passes through the floor plate 16A, is formed in the substantially central portion of the floor plate 16A. The gear opening 20 is for exposing a reel gear 42 which will be described later. An annular rib 22 for positioning of the reel 28 projects toward the inner side of the case 12 at the edge of the gear opening 20 of the floor plate 16A (see FIG. 2).

A pair of positioning holes 24, 26 are formed in a vicinity of the front end of the outer surface of the floor plate 16A of the case 12. The pair of positioning holes 24, 26 are formed in the shapes of bags within projections (not illustrated) which stand erect from the floor plate 16A toward the interior of the case 12. The positioning holes 24, 26 are disposed so as to be separated from one another on an imaginary line which is orthogonal to the loading direction. The positioning hole 24, which is the positioning hole which is closer to the opening 18, is formed in a substantially square shape, as seen in bottom view, which circumscribes a positioning pin of a drive device. The positioning pin 26 is a long hole whose longitudinal direction runs along the aforementioned imaginary line, and whose width corresponds to the diameter of a positioning pin.

In this way, when the recording tape cartridge 10 is loaded into a drive device and positioning pins are inserted into the respective positioning holes 24, 26, the recording tape cartridge 10 is correctly positioned in the horizontal directions (the left/right direction and the front/back direction) within the drive device.

The portions of the floor plate 16A around the positioning holes 24, 26 are positioning surfaces 24A, 26A which are finished so as to be smoother than the other portions of the floor plate 16A (the design surface of the floor plate 16A). When the positioning pins are inserted into the positioning holes 24, 26, the positioning surfaces 24A, 26A abut positioning surfaces of the drive device which are provided around the positioning pins. In this way, the vertical direction positioning of the recording tape cartridge 10 within the drive device is carried out.

As shown in FIG. 2, the reel 28, which will be described in detail later, is rotatably accommodated within the above-described case 12. Only one reel 28 is provided. A magnetic tape T serving as a recording tape is wound on the reel 28. A leader block 30, which serves as a pull-out member, is attached to the distal end of the magnetic tape T.

When the recording tape cartridge 10 is not being used, the leader block 30 is accommodated and held at the inner side of the opening 18 of the case 12. In this state, the leader block 30 closes the opening 18, and impedes entry of dust and the like into the case 12. An engaging recess 30A is formed in the distal end of the leader block 30. When the magnetic tape T is to be pulled-out within the drive device, a pull-out means, which engages with the engaging recess 30A, pulls the leader block 30 out of the case 12 and guides the leader block 30 to a take-up reel of the drive device. Moreover, the end surface of the leader block 30 at the side opposite the engaging recess 30A is an arc-shaped surface 30B. The arc-shaped surface 30B is fit into the take-up reel and forms a portion of the take-up surface around which the magnetic tape T is taken-up.

Hereinafter, the reel 28 and a braking means, which impedes rotation of the reel 28 when the recording tape cartridge 10 is not being used, will be described in detail. The reel 28 and the braking means are main portions of the present invention.

(Structure of Reel)

Figure 3:
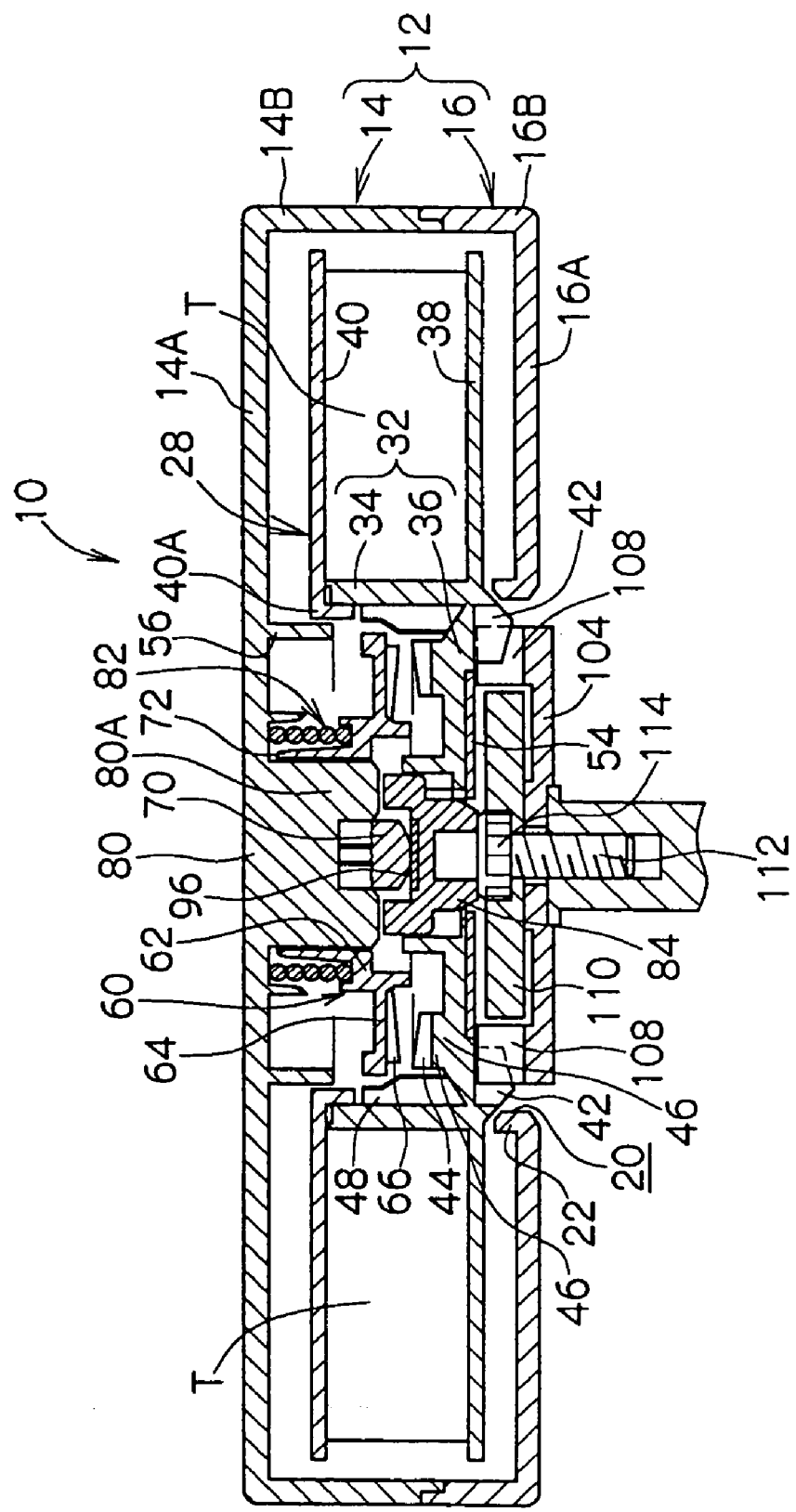
FIG. 3 is a sectional view at a time when locking of rotation of the reel is released in the recording tape cartridge relating to the embodiment of the present invention.
Figure 4:
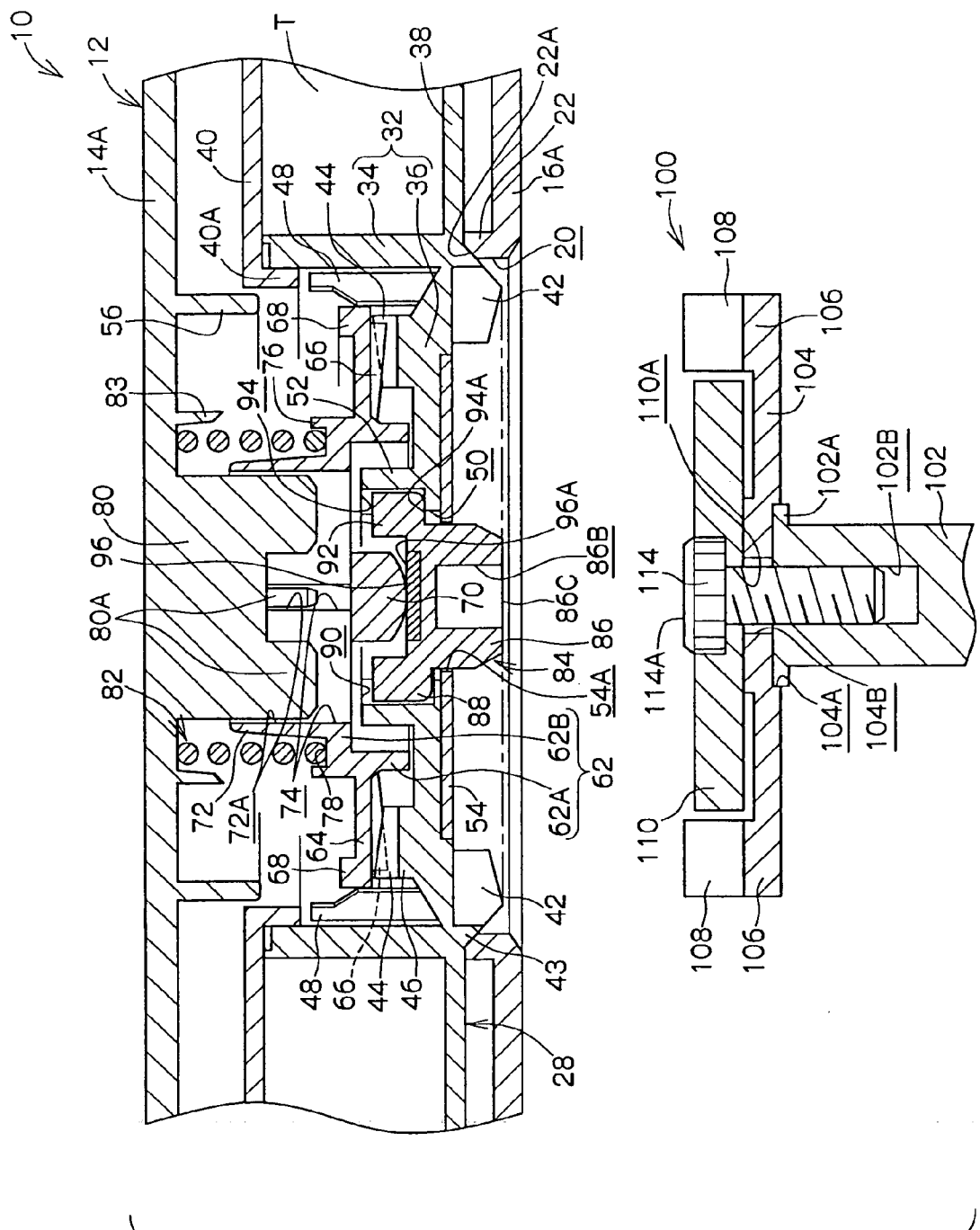
FIG. 4 is an enlarged sectional view of main portions at the time when rotation of the reel is locked in the recording tape cartridge relating to the embodiment of the present invention.
Figure 5:
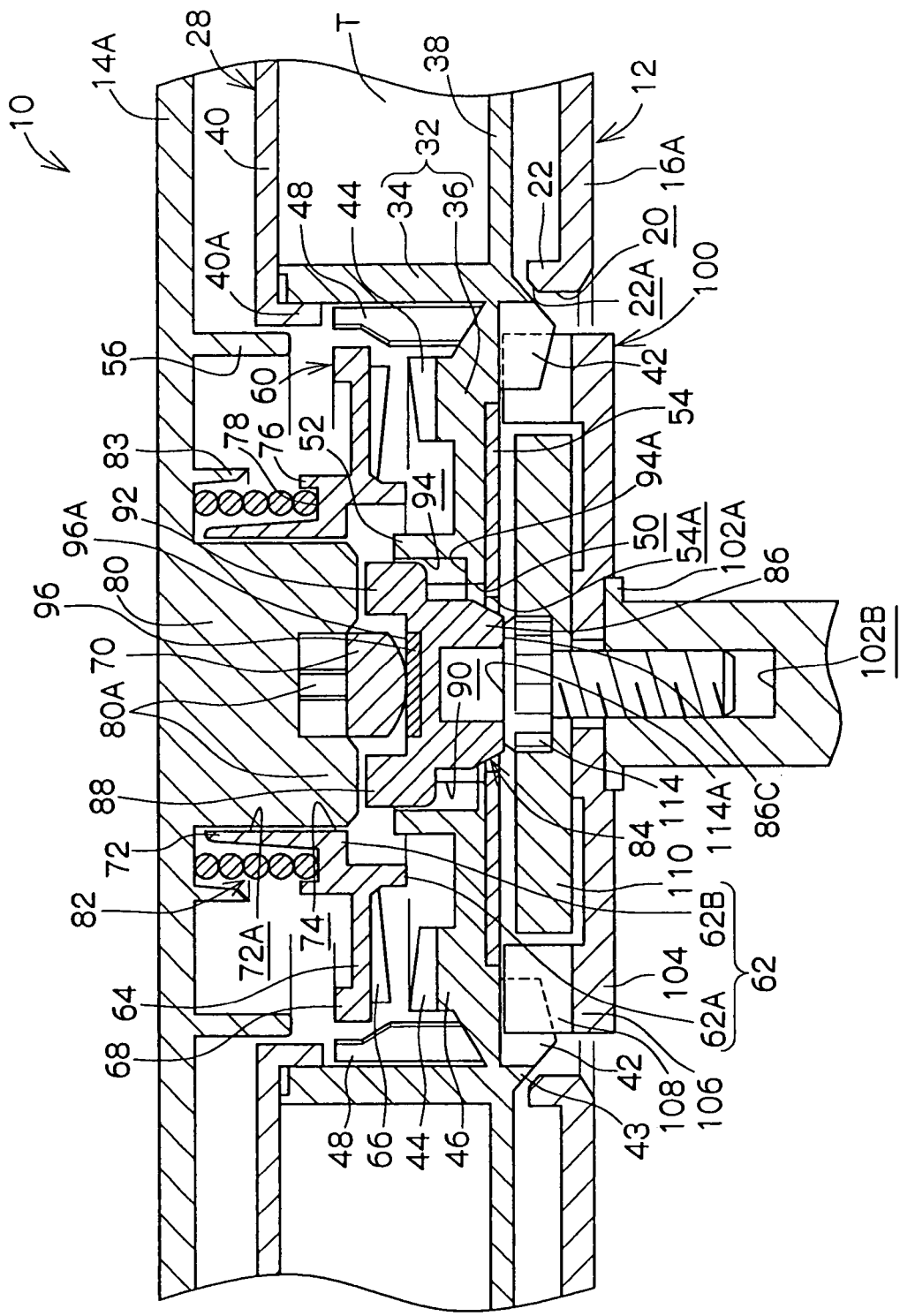
FIG. 5 is an enlarged sectional view of main portions at the time when locking of rotation of the reel is released in the recording tape cartridge relating to the embodiment of the present invention.
Figure 6:
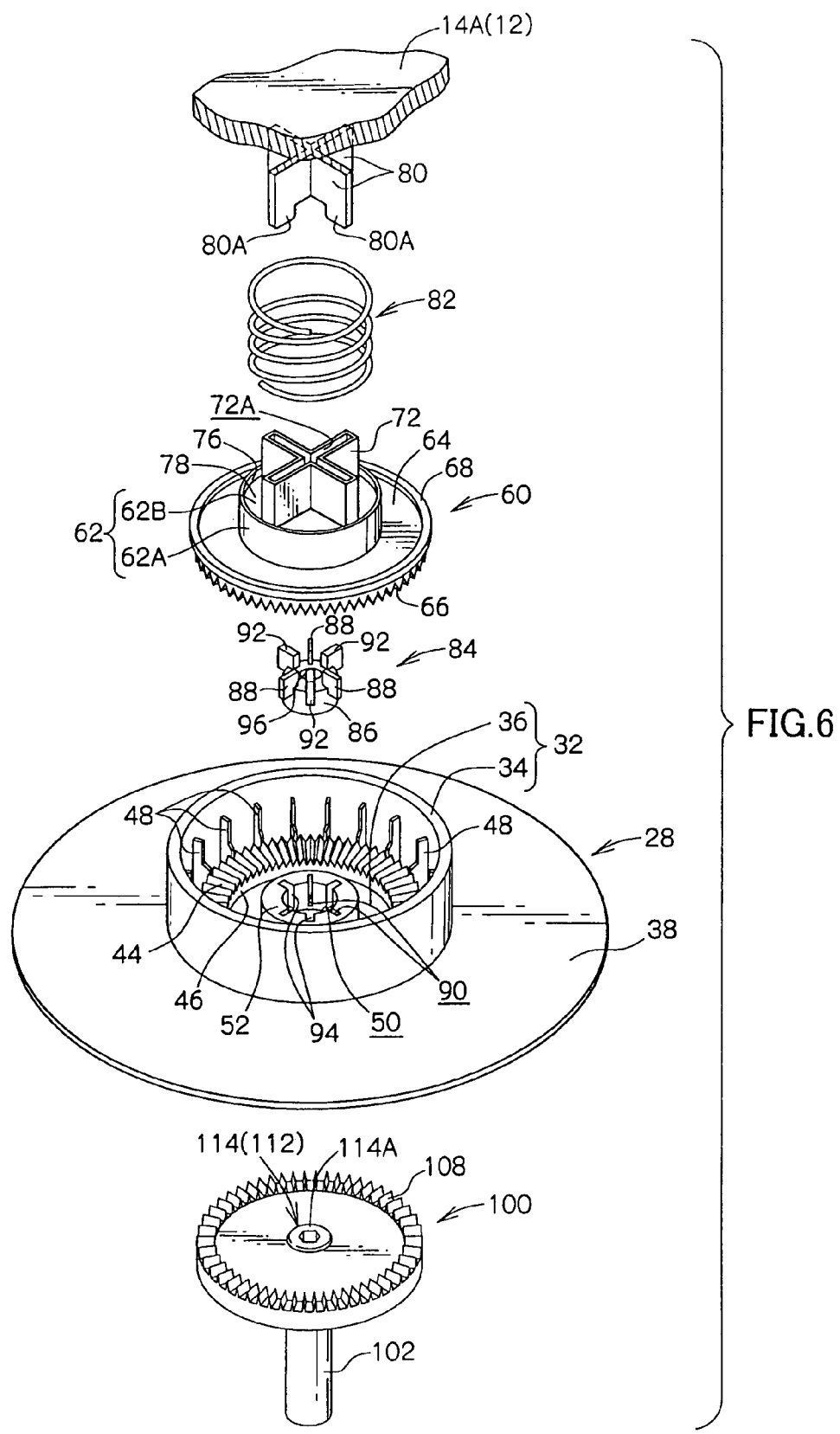
FIG. 6 is an exploded perspective view, as seen from above, showing a rotating shaft of a drive device, and a braking means which structures the recording tape cartridge relating to the embodiment of the present invention.

As shown in FIGS. 3 through 5, the reel 28 has a reel hub 32 which structures the axially central portion of the reel 28. The reel hub 32 is formed substantially in the shape of a hollow cylinder having a floor, and has a cylindrical portion 34 around whose outer peripheral surface the magnetic tape T is wound, and a floor portion 36 which closes the bottom portion of the cylindrical portion 34. As shown in FIG. 6 as well, a lower flange 38 extends coaxially and integrally at the radial direction outer side of the reel hub 32 from a vicinity of the floor portion 36 side end portion (i.e., the lower end portion) of the reel hub 32.

An upper flange 40 is joined to the upper end portion of the reel hub 32. (The upper flange 40 is omitted from illustration in FIGS. 6 through 8.) The outer diameter of the upper flange 40 is the same as the outer diameter of the lower flange 38. A short tube portion 40A, whose outer diameter corresponds to the inner diameter of the cylindrical portion 34, is provided at the axially central portion of the upper flange 40. The upper flange 40 is coaxially fixed to the reel hub 32 by ultrasonic welding in a state in which the short tube portion 40A is fit into the cylindrical portion 34 in a vicinity of the top end thereof.

At the reel 28, the magnetic tape T is wound on the outer peripheral surface of the cylindrical portion 34 of the reel hub 32 between the opposing surfaces of the lower flange 38 and the upper flange 40. The cylindrical portion 34 is open upwardly.

Figure 7:
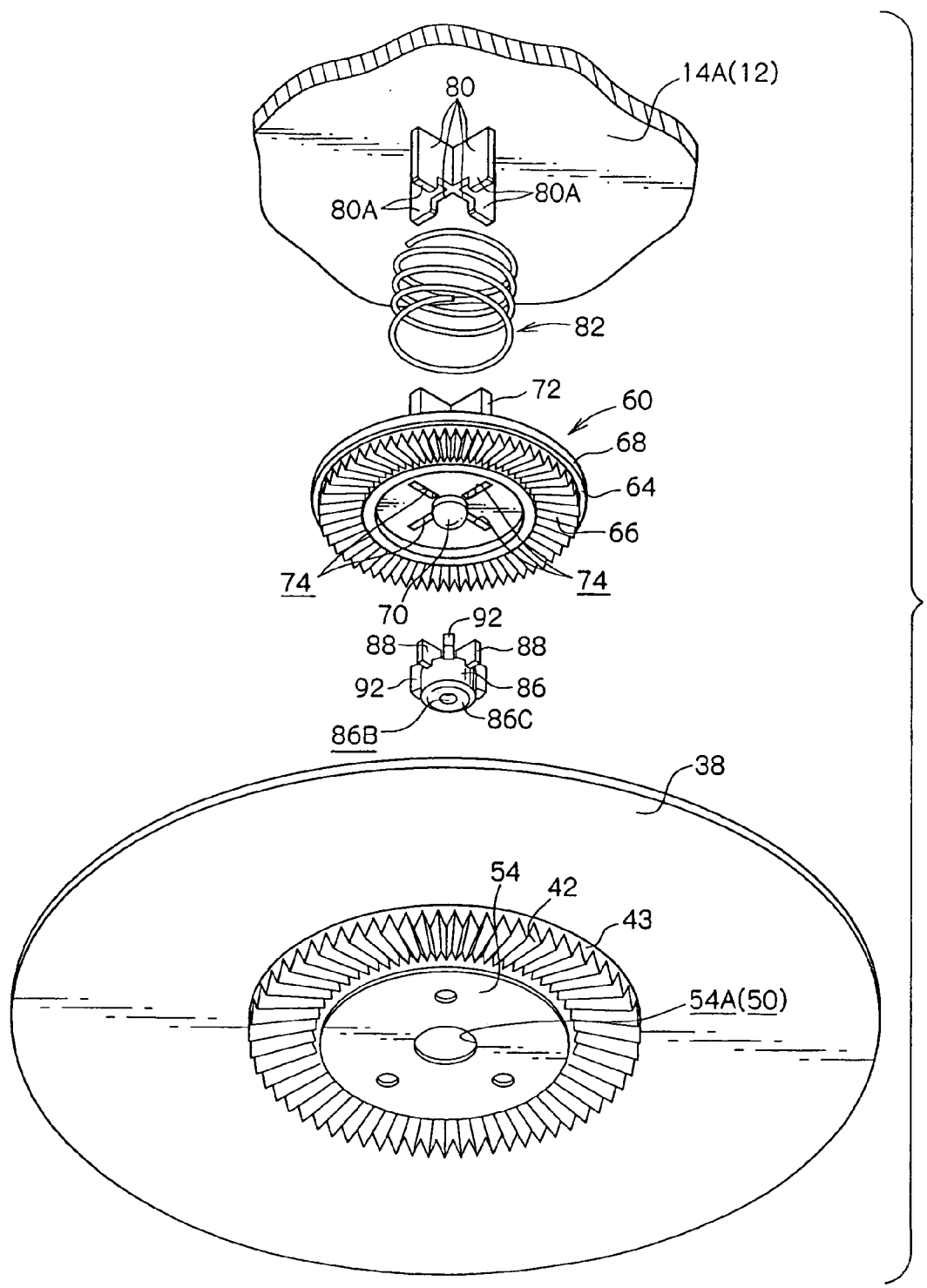
FIG. 7 is an exploded perspective view, as seen from below, showing the braking means which structures the recording tape cartridge relating to the embodiment of the present invention.
Figure 8:
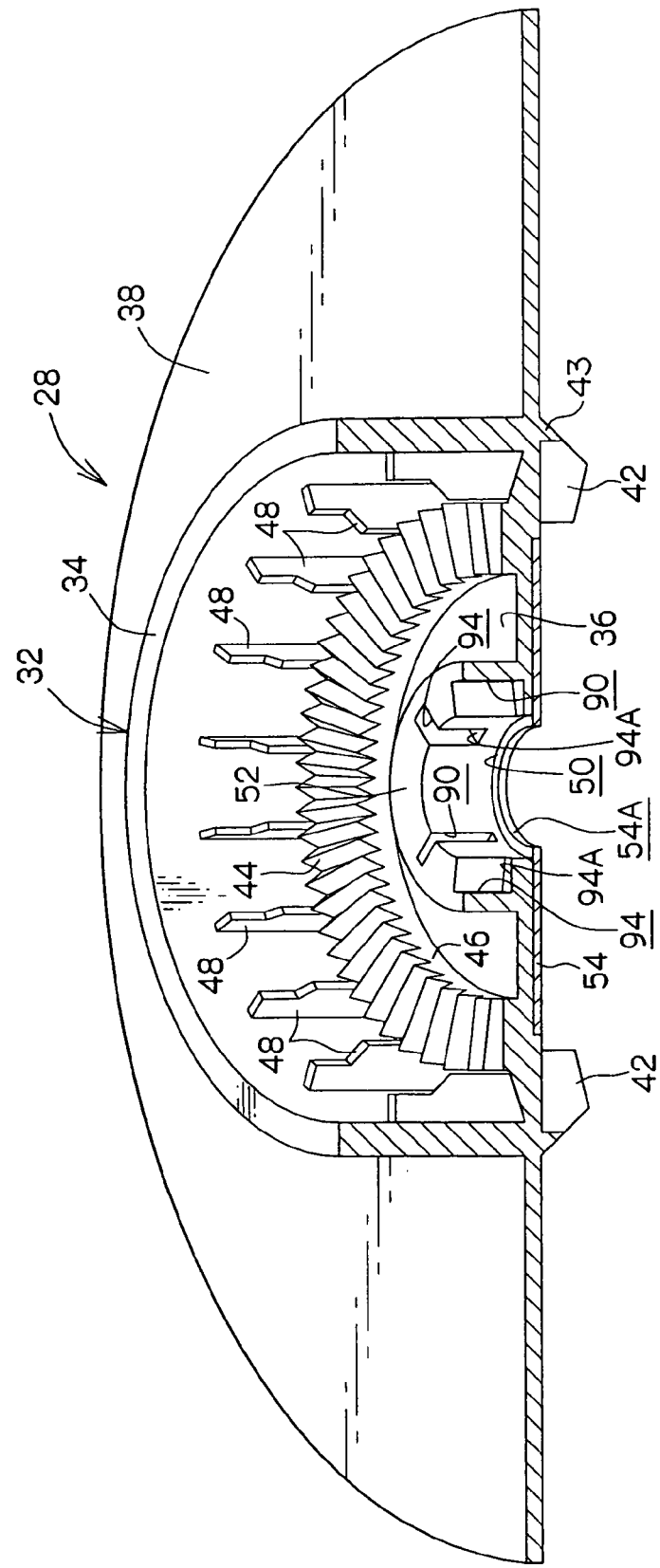
FIG. 8 is a cut diagram of the reel which structures the recording tape cartridge relating to the embodiment of the present invention.

As shown in FIGS. 7 and 8, the reel gear 42, which is formed overall in an annular shape which is coaxial with the reel 28, is formed in a vicinity of the outer periphery of the bottom surface (outer surface) of the floor portion 36 of the reel hub 32. The reel gear 42 can mesh with a driving gear 108 which is provided at the distal end of a rotating shaft 100 (to be described later) of a drive device. The radial direction outer side end portions of the respective teeth of the reel gear 42 are connected by a taper portion 43, which is continuous with the lower flange 38, from the central portions in the heightwise direction of the teeth to the teeth bottoms.

As shown in FIGS. 6 and 8, an engaging gear 44, which serves as an engaging portion and which is formed overall in an annular shape which is coaxial with the reel 28, is provided at the vicinity of the outer periphery of the top surface (the inner surface) of the floor portion 36 of the reel hub 32. The engaging gear 44 is formed on an annular pedestal portion 46 which protrudes slightly from the inner surface of the floor portion 36, and can mesh with a braking gear 66 of a braking member 60 which will be described later.

A plurality of standing ribs 48, which are continuous at the inner surface of the cylindrical portion 34 and the top surface of the floor portion 36, are provided at uniform intervals in the peripheral direction along the axial direction of the reel 28 at the radial direction outer side of the engaging gear 44 (the pedestal portion 46). Due to the existence of these standing ribs 48, the engaging gear 44 is positioned further toward the radial direction inner side than the reel gear 42. (Namely, the engaging gear 44 is provided along a circumference having a smaller diameter than that of the reel gear 42, and in the present embodiment, respective portions of the engaging gear 44 and the reel gear 42 overlap one another.) Note that the function of the standing ribs 48 will be described later together with the braking member 60.

A pass-through hole 50, which passes through the floor portion 36, is provided at the axially central portion of the floor portion 36 of the reel hub 32. A boss portion 52 for a clutch, which is shaped as a short cylinder, stands erect along the edge of the pass-through hole 50 from the top surface of the floor portion 36. The boss portion 52 for a clutch will be described later together with a clutch member 84.

The portions of the above-described reel 28, other than the upper flange 40, are formed integrally by resin molding. Moreover, a reel plate 54, which is an annular plate formed of a magnetic material, is provided coaxially and integrally by insert molding at the inner side of the reel gear 42 at the bottom surface of the floor portion 36 of the reel hub 32. A through hole 54A is formed in the axially central portion of the reel plate 54. The inner diameter of the through hole 54A is formed so as to be slightly smaller than the inner diameter of the pass-through hole 50.

The reel 28 is accommodated within the case 12, and is set on the annular rib 22 when the recording tape cartridge 10 is not in use. Specifically, as shown in FIG. 4, the portion of the floor portion 36 at the outer side of the taper portion 43 (i.e., a vicinity of the inner edge of the lower flange 38) abuts the top end surface of the annular rib 22, and radial direction movement of the reel 28 is restricted due to the inner edge portion of the top end of the annular rib 22 being a taper surface 22A corresponding to the taper portion 43.

In this state, the reel 28 is positioned on the whole within the case 12, and the reel gear 42 and the reel plate 54 are exposed from the gear opening 20 (see FIG. 1B). Namely, the reel gear 42 faces the exterior of the case 12 from the gear opening 20, without projecting further downward than the outer surface (the bottom surface) of the floor plate 16A.

The reel 28 can be operated, i.e., grasped (held) and driven to rotate, from the exterior of the case 12. Further, in this state, an annular restricting rib 56, which stands erect from the ceiling plate 14A, is disposed in the top portion of the cylindrical portion 34 of the reel 28. The outer peripheral surface of the restricting rib 56 is adjacent to the inner peripheral surface of the short tube portion 40A of the upper flange 40, such that joggling of the reel 28 within the case 12 is prevented.

(Structure of Braking Member)

The recording tape cartridge 10 has a braking means for impeding rotation of the reel 28 when the recording tape cartridge 10 is not in use. This braking means has the braking member 60 which serves as a "braking member". As shown in FIGS. 4 and 5, the braking member 60 has a main body portion 62. The main body portion 62 is substantially formed as a hollow cylinder which has a floor and which opens downward, by a tubular portion 62A formed in the shape of a short cylindrical tube and a disc portion 62B which closes the top end of the tubular portion 62A. The outer diameter of the tubular portion 62A is smaller than the inner diameter of the engaging gear 44 (the pedestal portion 46). The inner diameter of the tubular portion 62A is larger than the outer diameter of the boss portion 52 for a clutch.

A ring portion 64 formed in an annular form extends outwardly in the radial direction along the entire periphery, from an axial direction intermediate portion at the outer peripheral portion of the main body portion 62 (the tubular portion 62A). The braking gear 66 is provided along the entire periphery at the bottom surface of the ring portion 64. Namely, the braking gear 66 is formed in an annular form overall. The braking gear 66 is structured so as to be able to mesh with the engaging gear 44 of the reel 28. The inner end portions of the respective teeth forming the braking gear 66 are connected by the tubular portion 62A. The outer end portions of the teeth, which are in a free state, are positioned slightly further inward, in the radial direction, than the outer edge of the ring portion 64. Moreover, an annular reinforcing rib 68 stands erect at the top surface of the ring portion 64 along the outer edge portion thereof, such that the rigidity of the ring portion 64 (the braking gear 66) is ensured.

A slide-contact projection 70 projects from the axially central portion of the bottom surface of the disc portion 62B of the main body portion 62 (i.e., at the inner side of the tubular portion 62A). The distal end portion of the slide-contact projection 70 is formed substantially in the shape of a spherical surface, and substantially point-contacts a metal plate 96 of the clutch member 84 which will be described later. The distal end of the slide-contact projection 70 is positioned slightly higher than the bottom end surface of the tubular portion 62A (i.e., at the inner side of the tubular portion 62A).

A cross-shaped projection 72 stands erect at the top surface of the disc portion 62B. An insertion groove 72A, which is substantially cross-shaped in plan view, is formed in the cross-shaped projection 72. Through holes 74, which pass through the disc portion 62B in the direction of plate thickness thereof, are formed in the disc portion 62B. Four of the through holes 74 are formed so as to communicate with the radial direction outer side portions of the insertion groove 72A, except for the axially central portion of the insertion groove 72A which is formed in a cross-shape in plan view (i.e., except for the intersection portion of the insertion groove 72A). The through holes 74 are respectively formed in rectangular shapes (see FIG. 7). In this way, the respective through holes 74 are positioned adjacent to the radial direction outer side of the slide-contact projection 70, and open to the interior of the tubular portion 62A.

Further, an annular rib 76 stands erect at the outer peripheral portion of the top end of the main body portion 62. The top surface of the disc portion 62B between the rib 76 and the cross-shaped projection 72 is a spring receiving surface 78 which one end portion of a compression coil spring 82 (which will be described later) abuts.

The braking member 60 is inserted substantially coaxially in the cylindrical portion 34 of the reel hub 32 so as to be movable in the vertical direction (the axial direction of the reel 28). The braking member 60 can move in the vertical direction so as to be set at a position at which the braking gear 66 meshes with the engaging gear 44 of the reel hub 32 (a rotation locking position), and a position at which this meshing is released (a rotation permitting position). Note that the length of the tubular portion 62A is determined such that the bottom end surface of the tubular portion 62A does not abut the floor portion 36 when the braking member 60 is positioned at the rotation locking position (see FIG. 4).

A cross-shaped rib 80 (see FIGS. 6 and 7), which projects downward from the ceiling plate 14A of the case 12, is inserted in the insertion groove 72A of the cross-shaped projection 72 of the braking member 60. The cross-shaped rib 80 is formed in the shape of a detent which is formed as if two thin plates intersect one another orthogonally. When the cross-shaped rib 80 engages with the cross-shaped projection 72 (the groove walls of the insertion groove 72A), rotation of the braking member 60 with respect to the case 12 is impeded.

In the state in which the braking gear 66 meshes with the engaging gear 44 of the reel hub 32, the braking member 60 impedes rotation of the reel 28. Note that the state in which the cross-shaped rib 80 is inserted in the insertion groove 72A is maintained over the entire stroke of movement of the braking member 60 in the vertical direction, such that the cross-shaped rib 80 also functions to guide the direction of movement of the braking member 60 in the vertical direction. Moreover, the cross-shaped rib 80 has projecting pieces 80A which extend from the bottom end portion of the cross-shaped rib 80 at positions corresponding to the respective through holes 74 of the braking member 60. The widths of the respective projecting pieces 80A (i.e., the lengths of the projecting pieces 80A in the radial direction of the braking member 60) are narrow in accordance with the lengthwise dimensions of the respective through holes 74, and the projecting pieces 80A enter into respectively different ones of the through holes 74.

When the braking member 60 is positioned at the rotation locking position, the respective projecting pieces 80A are positioned within the insertion groove 72A (see FIG. 4). When the braking member 60 is positioned at the rotation permitting position, the projecting pieces 80A pass through the through holes 74 and project from the bottom surface of the disc portion 62B (see FIG. 5). In this way, due to the projecting pieces 80A being formed so as to extend, the amount of the cross-shaped rib 80 which is engaged with the braking member 60 (the depth of insertion thereof into the braking member 60) is greatly increased, and the cross-shaped rib 80 suppresses tilting of the braking member 60 with respect to the case 12. Note that, in the present embodiment, the engaged amount, in the axial direction, of the cross-shaped rib 80 (including the projecting pieces 80A) with the braking member 60 which is positioned at the rotation locking position, is set to be sufficiently larger than the entire stroke of movement of the braking member 60 (see FIG. 4).

When the braking member 60 is positioned at the rotation locking position, radial direction movement of the reel 28 is restricted by the standing ribs 48. When the braking member 60 is positioned at the rotation permitting position, there is no fear of interference between the braking member 60 and the standing ribs 48 which rotate together with the reel 28. The standing ribs 48 are positioned adjacent to the reinforcing rib 68 of the ring portion 64 of the braking member 60 which is positioned at the rotation locking position (see FIG. 4), and the top portions of the standing ribs 48 are cut such that the gap between the standing ribs 48 and the reinforcing rib 68 of the braking member 60 positioned at the rotation permitting position is greater than or equal to a predetermined value (see FIG. 5). Not only is movement of the reel 28 directly restricted by the case 12 (the annular rib 22, the restricting rib 56), but also, in a vicinity of the position of the center of gravity thereof, radial direction movement of the reel 28 with respect to the case 12 is restricted via the braking member 60. Accordingly, the recording tape cartridge 10 of the present embodiment can also stably be loaded in standing-type drive devices (in which the axis of the reel 28 is the horizontal direction).

The compression coil spring 82, which serves as an urging means, is disposed between the ceiling plate 14A and the spring receiving surface 78 of the braking member 60. One end portion of the compression coil spring 82 abuts the spring receiving surface 78, whereas the other end portion thereof abuts the ceiling plate 14A. This other end portion is positioned at the inner side of an annular wall portion 83 which projects at the outer side of the cross-shaped rib 80 at the ceiling plate 14A, such that the position of the compression coil spring 82 does not become offset in the radial direction.

Due to the urging force of the compression coil spring 82, the braking member 60 is urged downward, and usually, the braking gear 66 meshes with the engaging gear 44 such that inadvertent rotation of the reel 28 is prevented (i.e., the braking member 60 is positioned at the rotation locking position). Further, due to this urging force, the reel 28 is urged downward via the braking member 60, and abuts the annular rib 22 such that the reel 28 hardly joggles at all within the case 12.

(Structure of Clutch Member)

As shown in FIGS. 4 through 7, the braking means of the recording tape cartridge 10 is provided with the clutch member 84 which serves as a "releasing member" which is operated from the exterior at the time of releasing the state in which the reel 28 is locked by the braking member 60. The clutch member 84 is disposed between the floor portion 36 of the reel 28 and the braking member 60.

The clutch member 84 has a clutch main body 86 which is formed as a substantially solid cylinder. The outer diameter of the clutch main body 86 is formed so as to be slightly smaller than the through hole 54A of the reel plate 54, i.e., the inner diameter of the pass-through hole 50 which substantially coincides with the inner diameter of the boss portion 52 for a clutch. The metal plate 96, which serves as a metal flat plate and which always abuts the slide-contact projection 70 of the braking member 60, is fixed to the axially central portion of the top end of the clutch main body 86.

The flat bottom end surface of the clutch main body 86, which is around a thinning hole 86B which opens downward, is a press operation surface 86C. When the press operation surface 86C of the clutch member 84 is pressed upward, the clutch member 84 moves upward against the urging force of the compression coil spring 82, and moves the braking member 60 to the rotation permitting position.

The clutch member 84 has rotation restricting ribs 88 which jut out further toward the outer side in the radial direction than the outer peripheral surface of the clutch main body 86. Three of the rotation restricting ribs 88 are provided at uniform intervals in the peripheral direction of the clutch main body 86. The rotation restricting ribs 88 are disposed in a radial arrangement as seen in plan view. The respective rotation restricting ribs 88 are continuous so as to extend between the top end surface of the clutch main body 86 around the metal plate 96 and the outer peripheral surface of the clutch main body 86 in a vicinity of the top end surface thereof, and project further upward than the top end surface.

The rotation restricting ribs 88 are disposed within rotation restricting grooves (guide grooves) 90 which are formed in a recessed manner from the inner edge portion of the boss portion 52 for a clutch. The rotation restricting grooves 90 open upwardly at the top end of the boss portion 52 for a clutch. The clutch member 84 can move in the vertical direction while the rotation restricting ribs 88 thereof are guided by the rotation restricting grooves 90. Also when the clutch member 84 moves upward and positions the braking member 60 at the rotation permitting position, the state in which the rotation restricting ribs 88 are disposed in the rotation restricting grooves 90 is maintained. In this way, the clutch member 84 follows the rotation of the reel 28.

The clutch member 84 has seat ribs 92 which serve as stopper portions for impeding falling-out of the clutch member 84 from the reel hub 32, and for causing the metal plate 96 to abut the braking member 60 which is positioned at the rotation locking position. A total of three of the seat ribs 92 are provided at intermediate portions, in the peripheral direction, between the respective rotation restricting ribs 88 at the clutch member 86, and are disposed in a radial arrangement as seen in plan view. The seat ribs 92 are continuous so as to extend between the top end surface of the clutch main body 86 around the metal plate 96 and the outer peripheral surface of the clutch main body 86 in a vicinity of the top end surface thereof, and project upward and outward in the radial direction.

The respective seat ribs 92 are disposed in stopper grooves 94 which are recessed in from the inner edge portion of the boss portion 52 for a clutch. The stopper grooves 94 are open upwardly at the top end of the boss portion 52 for a clutch. The top surfaces of the floor portions which close the bottom end portions of the stopper grooves 94 are stopper surfaces 94A. When the braking member 60, whose slide-contact projection 70 always abuts the metal plate 96, is positioned at the rotation locking position, the bottom end surfaces of the seat ribs 92 abut (sit on) the stopper surfaces 94A. Positioning of the clutch member 84 in the rotation locked state of the reel 28 is thereby carried out.

In this way, due to the rotation restricting ribs 88 and the seat ribs 92 being provided independently of one another, the functions of the clutch member 84 are divided into, on the one hand, the guiding function and the rotation restricting function, and on the other hand, the function of restricting axial direction movement. At the clutch member 84, the clutch main body 86, the rotation restricting ribs 88, and the seat ribs 92 are formed integrally by resin molding.

Figure 9A:
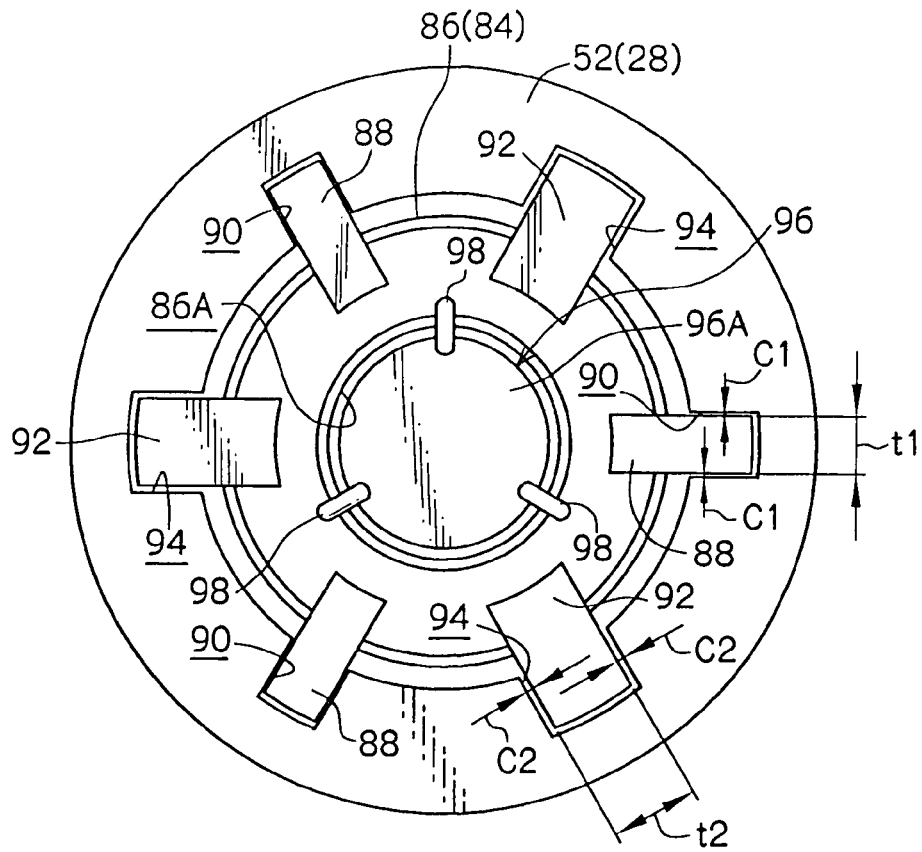
FIGS. 9A and 9B are drawings showing in detail a state in which a clutch member, which structures the recording tape cartridge relating to the embodiment of the present invention, is assembled to the reel, where
Figure 9B:
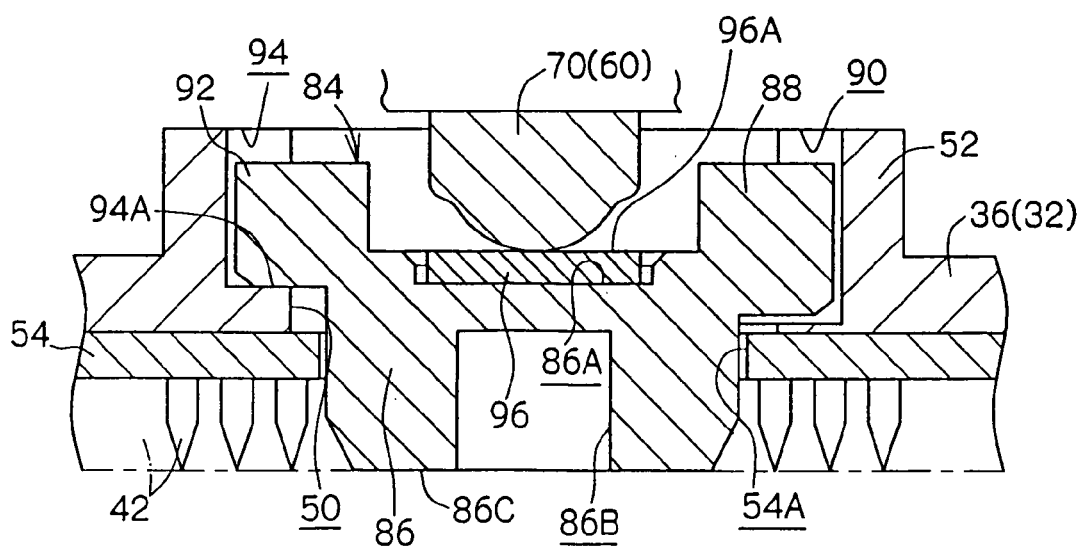

On the basis of the aforementioned difference in the functions, as shown in FIG. 9B, the rotation restricting ribs 88 are longer in the vertical direction than the seat ribs 92, and the rotation restricting grooves 90 are deeper in the vertical direction than the stopper grooves 94. Further, as shown in FIG. 9A, the rotation restricting ribs 88 are thinner than the seat ribs 92, and a clearance C1 at one peripheral direction side between the rotation restricting rib 88 and the rotation restricting groove 90 is smaller than a clearance C2 at one peripheral direction side between the seat rib 92 and the stopper groove 94.

Because the amount of the rotation restricting rib 88 which can engage with the boss portion 52 for a clutch is large, the stress received from the reel 28 at the time when the reel 28 rotates is mitigated, and the ability to guide the clutch member 84 when the clutch member 84 is moving up and down improves. Moreover, joggling of the clutch member 84 also when the braking member 60 is positioned at the rotation permitting position is suppressed. Further, the thickness of the rotation restricting rib 88 (i.e., the plate thickness thereof in the peripheral direction of the clutch member 84) is made to be thin within a range which does not present problems with respect to strength. The dimensional accuracy, resulting from the resin molding, of the rotation restricting rib 88 is high. Therefore, the clearance C1 can be made small to the extent that the sliding resistance at the time when the clutch member 84 moves up and down is not excessive, and the aforementioned joggling can be suppressed even more effectively. Note that, in the present embodiment, a thickness t1 of the rotation restricting rib 88 is 1.5 mm, and the clearance C1 is 0.05 mm.

Due to the seat ribs 92 being shorter than the rotation restricting ribs 88, the region at which the stopper surfaces 94A, which the seat ribs 92 abut, are formed at the reel 28, are thick because the stopper grooves 94 are shallow, and sufficient rigidity (strength against buckling) can be ensured with respect to the urging force of the compression coil spring 82. A thickness t2 of the seat rib 92 is 2 mm, and the seat rib 92 can be made to be even more rigid because it is relatively thick. A function of guiding the clutch member 84 is not required of the seat ribs 92 which are thick and whose dimensional accuracy resulting from the resin molding is relatively low, and the clearance C2 is 0.1 mm.

At the above-described clutch member 84, the clutch main body 86 is inserted through the pass-through hole 50 and the through hole 54A, in the state in which the rotation restricting ribs 88 are inserted in respectively different rotation restricting grooves 90 and the seat ribs 92 are inserted in respectively different stopper grooves 94. Further, usually, the respective seat ribs 92 are maintained in a state of abutting the stopper surfaces 94A, by the urging force of the compression coil spring 82 which is applied via the braking member 60. In this state, the bottom end surfaces of the rotation restricting ribs 88 are separated slightly from the floor surfaces of the rotation restricting grooves 90 (see FIG. 9B).

In this state, the upper portion of the clutch member 84 and the boss portion 52 for a clutch are set in the tubular portion 62A of the braking member 60. The tubular portion 62A, together with the boss portion 52 for a clutch, forms a labyrinthine structure, such that entry of dust into the case 12 (the reel hub 32) via the pass-through hole 50 is suppressed. Further, from the standpoint of the function thereof, there is no need for the seat ribs 92 to enter into the stopper grooves 94. However, entry of dust into the reel hub 32 is impeded due to the seat ribs 92 being disposed in the stopper grooves 94.

As the reel gear 42 meshes with the driving gear 108 provided at the rotating shaft 100 of the drive device, the clutch member 84 is pressed by a releasing surface 114A of the rotating shaft 100 while being abutted by the releasing surface 114A, and moves upward.

Figure 13:
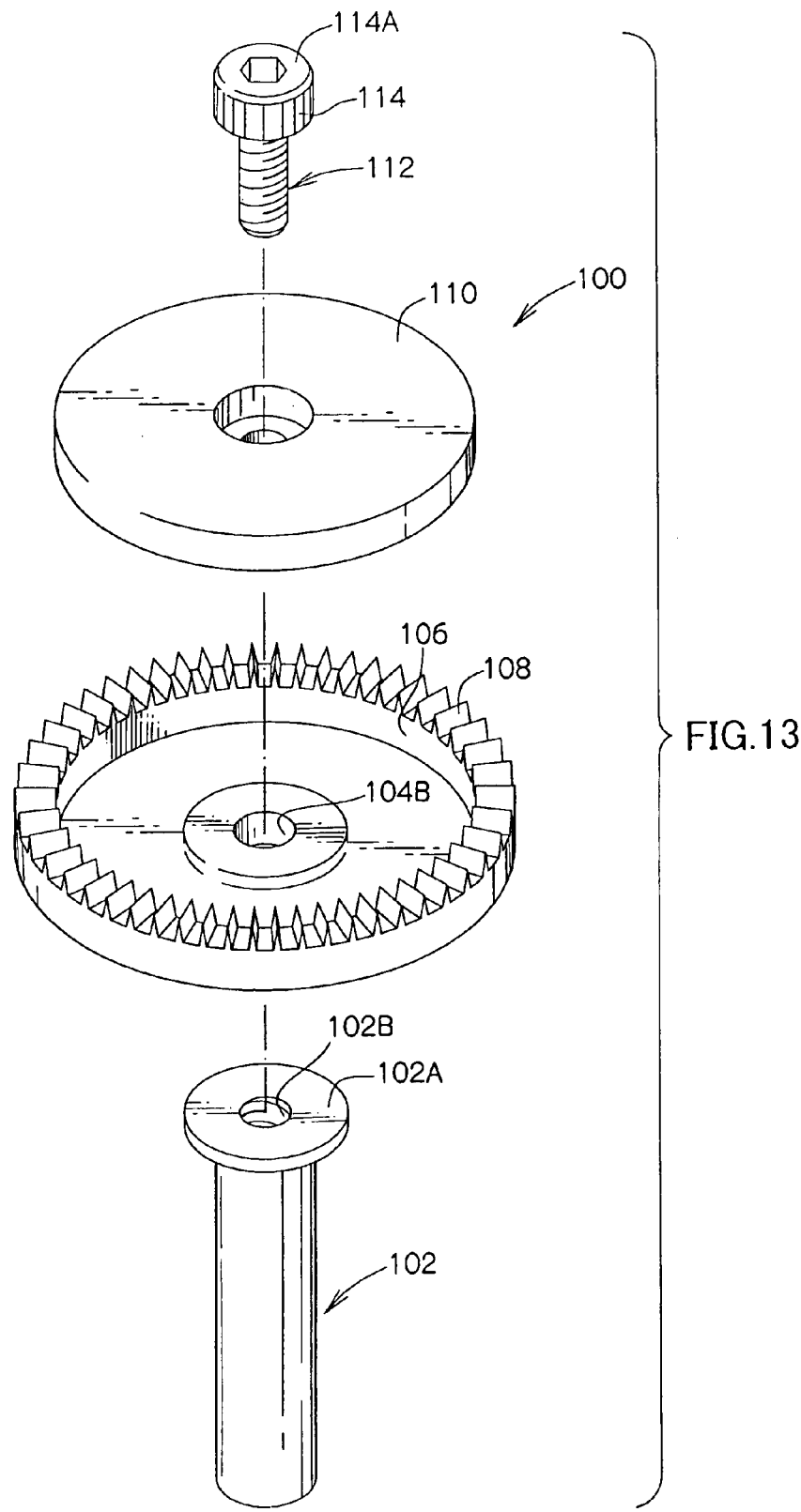
FIG. 13 is an exploded perspective view of the rotating shaft of the drive device into which the recording tape cartridge relating to the embodiment of the present invention is loaded.

As shown in the exploded perspective view of FIG. 13, the rotating shaft 100 has a rotating shaft portion 102. A fit-together concave portion 104A, which is formed at the axially central portion of a rotating table 104, is fit on a flange portion 102A which extends outwardly in the radial direction from the top end of the rotating shaft portion 102. The driving gear 108, which can mesh with the reel gear 42 of the recording tape cartridge 10, is formed at the top end of an annular wall 106 which stands erect from the top surface of the rotating table 104 along the outer peripheral portion thereof. A substantially disc-shaped magnet 110 is inserted in at the inner side of the annular wall 106 at the rotating table 104. The magnet 110 and the rotating table 104 are fixed to the rotating shaft portion 102 by an unillustrated screw. The rotating shaft 100 has a pressing bolt 112 which passes through the axially central portions of the magnet 110 and the rotating table 104, and is screwed into a screw hole 102B of the rotating shaft portion 102. The top end surface of a head portion 114 of the pressing bolt 112 is the releasing surface 114A which abuts the press operation surface 86C of the clutch member 84. The releasing surface 114A is finished to a flatness which is equivalent to or greater than that of the magnet 110. The posture of the clutch member 84 which abuts the releasing surface 114A is thereby stable. At the rotating shaft 100, the height of the releasing surface 114A can be adjusted by changing the amount of the pressing bolt 112 which is screwed together with the screw hole 102B.

When the recording tape cartridge 10 is loaded into the drive device, the recording tape cartridge 10 moves downward, and relatively approaches the rotating shaft 100 from the axial direction. In this way, the driving gear 108 of the rotating shaft 100 meshes with the reel gear 42 which is exposed from the gear opening 20, and the reel plate 54 is attracted by the magnet 110 of the rotating shaft 100 in a state of being slightly set apart therefrom, and the reel 28 is held at the rotating shaft 100.

Accompanying this meshing operation (i.e., the above-described relative approach in the axial direction), the press operation surface 86C of the clutch member 84 abuts the releasing surface 114A. In this state of abutment, the clutch member 84 is pressed by the rotating shaft 100 and moves upward, and moves the braking member 60 to the rotation permitting position. In this way, accompanying the meshing of the driving gear 108 with the reel gear 42, the reel 28 rises upward within the case 12 against the urging force of the compression coil spring 82, the state in which rotation is impeded by the braking member 60 is released, and the reel 28 becomes able to rotate within the case 12. In the state in which the reel gear 42 is meshed with the driving gear 108, the state of abutment between the releasing surface 114A and the press operation surface 86C of the clutch member 84 is maintained, and the braking member 60 is held at the rotation permitting position.

When the reel 28 rotates, there is no relative rotation between the clutch member 84 (which rotates integrally with the reel 28) and the rotating shaft 100 (which drives the reel 28). On the other hand, the metal plate 96 and the slide-contact projection 70 slidingly contact one another due to the relative rotation of the braking member 60, which cannot rotate with respect to the case 12, and the clutch member 84.

(Structure of Metal Plate)

Figure 12:
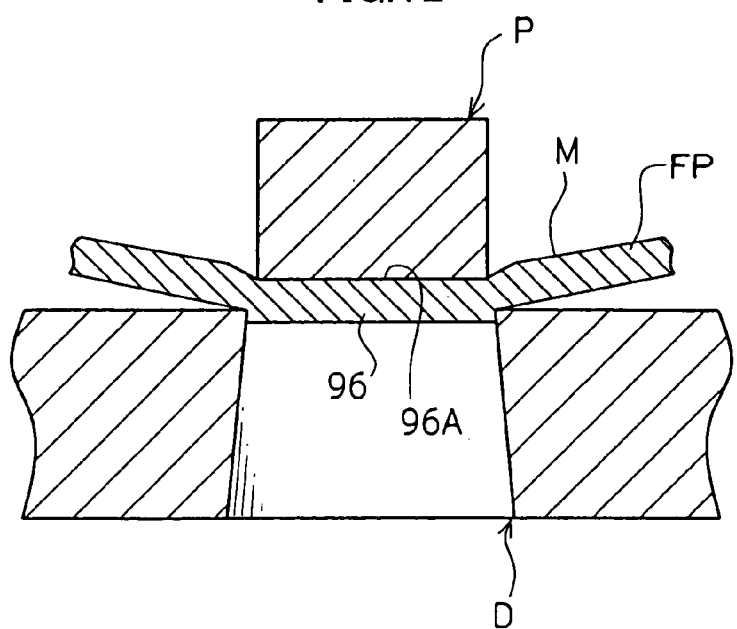
FIG. 12 is a sectional view showing the state of a process for punching a metal plate, which structures the recording tape cartridge relating to the embodiment of the present invention, from a flat plate member.

The metal plate 96 is formed of stainless steel, and, as shown in FIGS. 9A, 9B, 10A, and 10B, is formed in the shape of a flat disc. More specifically, as shown in FIG. 12, the metal plate 96 is formed by being punched from a stainless steel flat plate member FP by using a punch P and a die D (i.e., by press working). One surface of the flat plate member FP is a mirror surface M which is finished by mechanical working (grinding or polishing), plating, coating, or the like. The metal plate 96 is formed by being punched with the mirror surface M thereof set at the punch P side. The mirror surface M side surface of the metal plate 96 is an abutment surface 96A which abuts the slide-contact projection 70 of the braking member 60.

The surface roughness of the abutment surface 96A which is the mirror surface M is, in terms of arithmetic mean roughness (Ra) or central line mean roughness ($Ra_{75}$), in the range of 0.01 μm to 0.3 μm, and preferably within the range of 0.01 μm to 0.1 μm. Note that it is preferable that the abutment surface 96A be finished by mechanical working without using plating or coating processing.

Figure 10A:
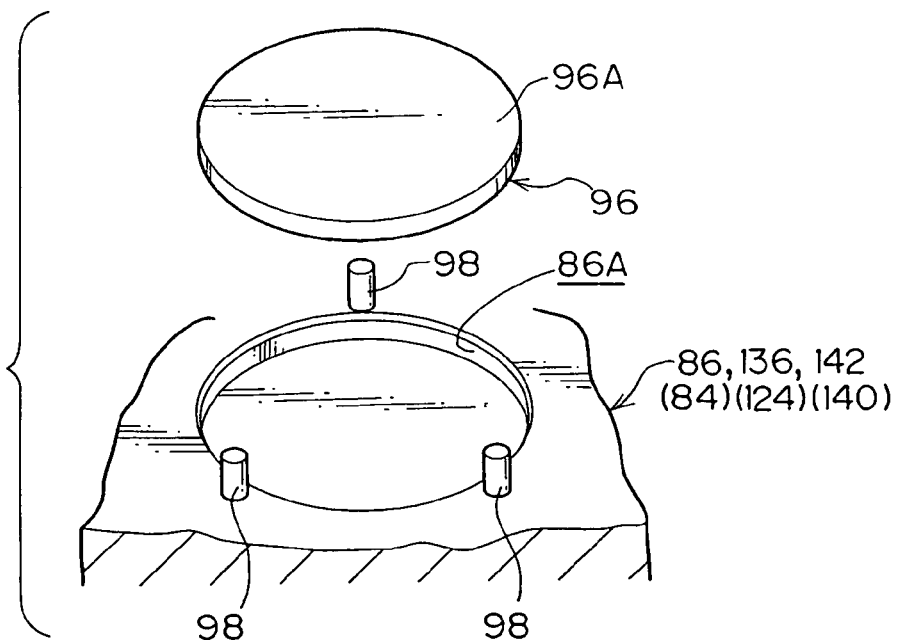
FIGS. 10A and 10B are drawings showing a metal plate fixing structure which structures the recording tape cartridge relating to the embodiment of the present invention, where
Figure 11A:
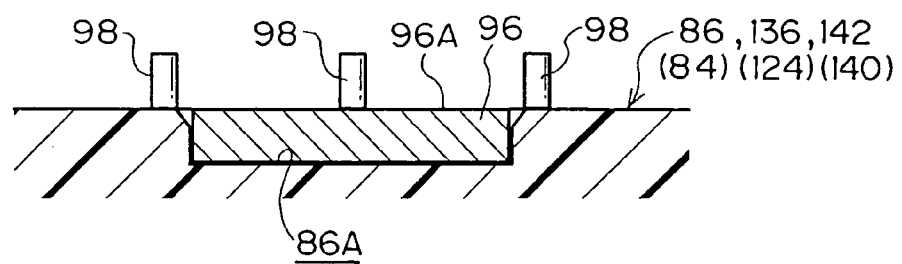
FIGS. 11A and 11B are drawings showing the metal plate fixing structure which structures the recording tape cartridge relating to the embodiment of the present invention, where

The metal plate 96 is fixed to the top end of the clutch main body 86, and forms the clutch member 84. The structure for this fixing will be described hereinafter. As shown in FIGS. 10A and 11A, a concave portion 86A is formed in the top surface of the clutch main body 86. The concave portion 86A is formed in the shape of a circle (as seen in plan view) so as to substantially correspond to the metal plate 96. The inner diameter of the concave portion 86A is slightly larger than outer diameter of the metal plate 96. The depth of the concave portion 86A is substantially equal to the thickness of the metal plate 96. The edge of the opening of the concave portion 86A is chamfered.

Figure 10B:
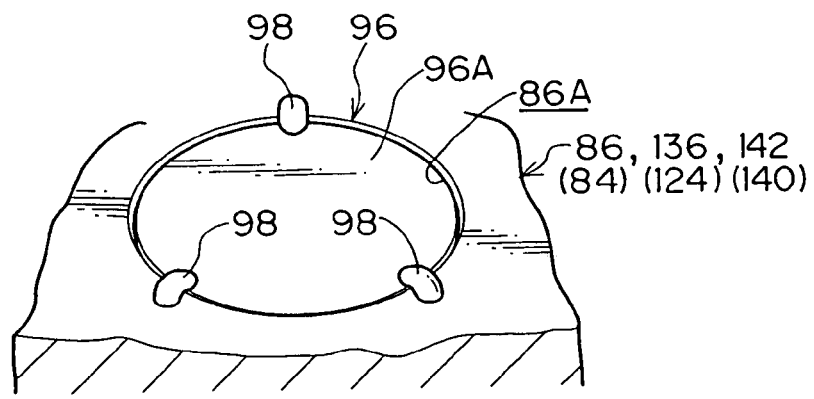
Figure 11B:
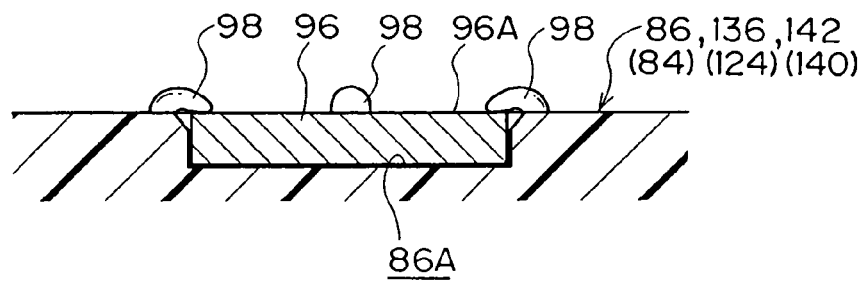

As shown in FIGS. 10B and 11B, the metal plate 96 is inserted into the concave portion 86A such that its abutment surface 96A is exposed upwardly. The metal plate 96 is positioned within the concave portion 86A such that there is a clearance, in the radial direction, therebetween. The tolerance of the heightwise position of the abutment surface 96A with respect to the top end surface of the clutch main body 86 is set to be ±0.3 mm. Note that the plate thickness of the metal plate 96 (the flat plate member FP) is preferably 0.05 mm or more, and 0.15 mm or more is more preferable from the standpoint of preventing warping and the like. The upper limit of the plate thickness of the metal plate 96 is determined depending on the depth of the concave portion 86A, so as to satisfy the aforementioned tolerance.

A plurality (three in the present embodiment) of projections 98 for caulking (crimping) project integrally from the top end surface of the clutch main body 86. The projections 98 are formed integrally at the time of resin molding the clutch member 84 (except for the metal plate 96). The projections 98 are disposed at uniform intervals in the peripheral direction along the edge portion of the concave portion 86A, so as to surround the concave portion 86A. Each of the projections 98 for caulking (crimping) is formed substantially in the shape of a solid cylinder, and the outer diameter of each is in the range of 0.4 mm to 1.8 mm, and is preferably in the range of 0.5 mm to 1.0 mm.

The metal plate 96 is fixed to the clutch main body 86 by being inserted into the concave portion 86A of the clutch main body 86 and the projections 98 being thermally crimped. Namely, the metal plate 96 is nipped and fixedly held between the floor surface of the concave portion 86A and the projections 98 which have been caulked (crimped) (see FIGS. 10B and 11B).

Note that the height by which the projections 98 project from the top end surface of the clutch main body 86 is determined such that, after caulking (crimping), the projections 98 for caulking do not interfere with the braking member 60 (the slide-contact projection 70) even if the braking member 60 tilts.

Next, operation of the present embodiment will be described.

When the recording tape cartridge 10 is not being used, due to the urging force of the compression coil spring 82, the braking member 60 is positioned at the rotation locking position, and the braking gear 66 and the engaging gear 44 are meshed together. Therefore, rotation of the reel 28 with respect to the case 12 is impeded. At this time, the reel gear 42 of the reel 28 is exposed from the gear opening 20, and the clutch main body 86 of the clutch member 84 is inserted through the pass-through hole 50 and the through hole 54A and faces the gear opening 20.

When the recording tape cartridge 10 (the magnetic tape T) is to be used, the recording tape cartridge 10 is loaded into a bucket (not illustrated) of a drive device along the direction of arrow A. When the recording tape cartridge 10 is inserted in the bucket to a predetermined depth (i.e., to a predetermined position along the direction of insertion), the bucket is lowered. The rotating shaft 100 of the drive device relatively approaches the gear opening 20 of the case 12 (i.e., moves upward), and holds the reel 28. Specifically, while the reel plate 54 is attracted and held by the magnet 110 in a non-contact state, the driving gear 108 of the rotating shaft 100 meshes with the reel gear 42.

Accompanying this meshing of the reel gear 42 and the driving gear 108, i.e., the relative movement of the rotating shaft 100 toward the case 12 in the axial direction, the releasing surface 114A of the rotating shaft 100 abuts the press operation surface 86C of the clutch member 84, and pushes the clutch member 84 upward. Due to this pushing force, the clutch member 84 moves upwardly in the axial direction of the reel 28 against the urging force of the compression coil spring 82 while the rotation restricting ribs 88 of the clutch member 84 are guided by the rotation restricting grooves 90. In this way, the braking member 60, which is abutting the metal plate 96 of the clutch member 84 at the slide-contact projection 70, also moves upward, and the meshing of the engaging gear 44 and the braking gear 66 of the braking member 60 is released. Namely, the braking member 60 reaches the position where rotation relative to the reel 28 is permitted.

When the rotating shaft 100 moves relatively and further upward, the reel 28 is raised up together with the clutch member 84 and the braking member 60 (i.e., with their relative positions unchanged) against the urging force of the compression coil spring 82. The braking member 60 reaches the absolute rotation permitting position (the position where rotation with respect to the case 12 is permitted), and the lower flange 38 moves away from the annular rib 22 (the taper surface 22A). In this way, the reel 28 rises up within the case 12, and becomes able to rotate in a state of not contacting the inner surfaces of the case 12.

Due to the lowering of the bucket, i.e. the recording tape cartridge 10, within the drive device, the positioning pins of the drive device enter into the positioning holes 24, 26 of the case 12, and the positioning surfaces of the drive device abut the positioning surfaces 24A, 26A of the case 12. In this way, the recording tape cartridge 10 is positioned in the horizontal direction and the vertical direction with respect to the drive device.

Next, the pull-out means (not illustrated) of the drive device pulls the leader block 30 out from the case 12 and guides the leader block 30 to the take-up reel of the drive device, while a pull-out pin of the pull-out means engages with the engaging recess 30A of the leader block 30. The leader block 30 is fit into the take-up reel, and the arc-shaped surface 30B forms a portion of the take-up surface on which the magnetic tape T is taken up.

When the leader block 30 rotates integrally with the take-up reel, the magnetic tape T is pulled-out from the case 12 through the opening 18 while being taken-up onto the reel hub of the take-up reel. At this time, the reel 28 of the recording tape cartridge 10 rotates synchronously with the take-up reel due to the torque of the rotating shaft 100 which is transmitted by the driving gear 108 which meshes with the reel gear 42.

Information is recorded onto the magnetic tape T or information recorded on the magnetic tape T is played back by a recording/playback head disposed along a predetermined tape path of the drive device. At this time, the slide-contact projection 70 of the braking member 60, which cannot rotate with respect to the case 12, slidingly contacts the abutment surface 96A of the metal plate 96 of the clutch member 84 which rotates together with the reel 28 with respect to the case 12.

On the other hand, when the magnetic tape T is rewound onto the reel 28 and the leader block 30 is held in a vicinity of the opening 18 of the case 12, the bucket in which the magnetic tape cartridge 10 is loaded is raised. In this way, the meshing of the reel gear 42 and the driving gear 108 is cancelled, the abutment of the releasing surface 114A and the press operation surface 86C of the clutch member 84 is released, and the clutch member 84 moves downward, together with the braking member 60 (i.e., with the state of abutment between the clutch member 84 and the braking member 60 maintained), due to the urging force of the compression coil spring 82.

In this way, the seat ribs 92 of the clutch member 84 abut the stopper surfaces 94A, and the braking gear 66 of the braking member 60 meshes with the engaging gear 44. Namely, the braking member 60 is returned to the rotation locking position at which the braking member 60 impedes rotation of the reel 28 with respect to the case 12. Moreover, as the braking member 60 and the clutch member 84 move due to the urging force of the compression coil spring 82, the reel 28 also moves downward and returns to its initial state in which the reel gear 42 is exposed from the gear opening 20 while the lower flange 38 of the reel 28 abuts the annular rib 22. In this state, the recording tape cartridge 10 is discharged from the bucket.

Here, at the recording tape cartridge 10, the braking member 60 and the clutch member 84 abut one another at the slide-contact projection 70, which is formed of a resin material, and the metal plate 96. Therefore, wear of the regions of abutment which slidingly contact one another as the reel 28 rotates, i.e., wear of the slide-contact projection 70 formed of resin and the metal plate 96, is prevented.

The metal plate 96 is fixed to the clutch main body 86 of the clutch member 84 by the projections 98, which are formed of resin, being caulked (crimped). Therefore, the metal plate 96 is reliably fixed to the clutch main body 86 although it is merely a flat plate. In particular, because a plurality of the projections 98 are provided so as to surround the metal plate 96 from the outer peripheral side thereof, the metal plate 96 is reliably fixed to the clutch main body 86, and it is possible to effectively prevent the metal plate 96 from falling out from the clutch main body 86 due to the impact of a drop or the like.

Therefore, there is no need to provide claw portions which are to be embedded into resin portions or are to be engaged with holes, as in the case in which the metal plate 96 is fixed to the clutch main body 86 by insert molding or fitting. The metal plate 96 is not subjected to bending processing by a press or the like, and the metal plate 96 can be formed extremely simply merely by being punched by the punch P and the die D. Further, there is no need to accurately position the metal plate 96 with respect to a mold, as in the case of insert molding. Therefore, while the function of preventing wear of the regions of abutment (the regions of sliding contact) between the braking member 60 and the clutch member 84 is ensured, the produceability of the clutch member 84, which is structured such that the metal plate 96 is fixed to the clutch main body 86, is improved.

In this way, in the recording tape cartridge 10 relating to the present embodiment, wear of the regions of abutment between the braking member 60 and the clutch member 84, at the time when the reel 28 rotates, can be reduced by a structure which has good produceability.

Further, the concave portion 86A, into which the metal plate 96 is inserted, is set in the clutch main body 86 of the recording tape cartridge 10. Therefore, the height by which the metal plate 96 (the abutment surface 96A) projects from the top end surface of the clutch main body 86 can be made to be small, or such projecting of the metal plate 96 (the abutment surface 96A) can be eliminated. Therefore, the height (thickness) which the clutch main body 84 occupies overall in the limited space within the case 12 is kept low, and the stroke of movement of the braking member 60 between the rotation locking position and the rotation permitting position can be made to be large. Further, before caulking (crimping), movement of the metal plate 96 in the radial direction within the concave portion 86A is restricted (i.e., the metal plate 96 is positioned in the radial direction within the concave portion 86A). Therefore, the caulking (crimping) work is easy. Moreover, because the inner diameter of the concave portion 86A is larger than the outer diameter of the metal plate 96, even in an automated assembly process, the metal plate 96 can be easily inserted and placed in the concave portion 86A of the clutch main body 86.

In addition, the surface at the punch P side at the time when the metal plate 96 is formed by being punched out from the stainless steel flat plate member FP by the punch P and the die D, is made to be the abutment surface 96A. Therefore, at the abutment surface 96A side, there are no burrs due to the punching. Accordingly, even if misalignment were to arise between the braking member 60 and the clutch member 84, the slide-contact projection 70, which slidingly contacts the abutment surface 96A of the metal plate 96, is protected as it is not hit by burrs. Further, there is no need for mechanical processing or the like for removing burrs of the metal plate 96, and the produceability of the metal plate 96 is further improved.

One surface of the stainless steel flat plate member FP is finished to a mirror surface before the punching processing, and the metal plate 96 is punched out from the flat plate member FP with this mirror surface M being at the punch P side. Therefore, the abutment surface 96A is formed by the mirror surface M. Resistance to the sliding contact between the braking member 60 and the clutch member 84 is reduced, and wear due to the sliding contact is even more reliably prevented. Further, because the metal plate 96 is punched out with the mirror surface M being at the punch P side, scratching of the abutment surface 96A, which is the mirror surface M, accompanying the punching is prevented.

Modified Example of Reel and Braking Means

Next, a modified example of the reel and the braking means will be described. Note that parts and portions which are substantially the same as those of the above-described embodiment are denoted by the same reference numerals, and description thereof will be omitted for convenience.

FIG. 14A is an exploded perspective view, as seen from above, of a reel 120, a braking member 122 and a release pad 124 relating to a first modified example. FIG. 14B is an exploded perspective view, as seen from below, of these parts.

The reel 120 has a reel hub 128 which is formed in the shape of a hollow cylinder having a floor, by the cylindrical portion 34 and a floor portion 126. The reel gear 42 is formed at the bottom surface of the floor portion 126 of the reel hub 128. Insert-through holes 130, which pass through the floor portion 126, are formed at three places at uniform intervals on a circumference at the region where the reel gear is formed at the floor portion 126. The diameter of each insert-through hole 130 is greater than the gear pitch of the reel gear 42. The teeth of the reel gear 42 are not provided around each insert-through hole 130.

Anchor projections 132 stand erect at the top surface of the floor portion 126 of the reel hub 128 at plural places (i.e., discretely) between the insert-through holes 130 and along a predetermined circumference. A gear tooth 133 (see FIGS. 15A and 15B) which can mesh with the braking gear 66 of the braking member 122 is formed at the top end portion of each of the anchor projections 132. The braking member 122 is inserted in the reel hub 128.

The braking member 122 has a disc portion 134 which is formed in the shape of a disc and at whose bottom surface the braking gear 66 is provided, the cross-shaped projection 72 (insertion groove 72A) standing erect at the top surface of the disc portion 134, and the slide-contact projection 70 which projects slightly from the axially central portion of the bottom surface of the disc portion 134. These portions are formed integrally of a resin. The spring receiving surface 78 is formed at the radial direction outer side of the cross-shaped projection 72 at the top surface of the disc portion 134.

The cross-shaped rib 80 of the case 12 is inserted in the insertion groove 72A, and the braking member 122 cannot rotate with respect to the case 12 but can move in the vertical directions while being guided by the cross-shaped rib 80. In this way, the braking member 122 can be selectively set at a rotation locking position (see FIG. 15A) at which the braking gear 66 meshes with the gear teeth 133 and rotation of the reel 120 with respect to the case 12 is impeded, and a rotation permitting position (see FIG. 15B) at which the meshing of the braking gear 66 with the gear teeth 133 is cancelled and rotation of the reel 120 with respect to the case 12 is permitted. The braking member 122 is usually positioned at the rotation locking position due to the urging force of the compression coil spring 82 which is disposed between the spring receiving surface 78 of the braking member 122 and the ceiling plate 14A of the case 12.

The release pad 124 is disposed between the floor portion 126 of the reel hub 128 and the braking member 122. The release pad 124 has a pad main body 136 which is formed in the shape of a substantially triangular plate as seen in plan view so as to not interfere with the respective anchor projections 132, and leg portions 138 which stand erect downward from vicinities of the vertices of the pad main body 136. The pad main body 136 and the respective leg portions 138 are formed integrally by resin molding. The metal plate 96 is fixed to the top surface of the axially central portion (the central portion) of the pad main body 136. The structure for fixing the metal plate 96 is similar to that in the case of the clutch member 84 relating to the previously-described embodiment. As shown in FIGS. 10A, 10B, 11A and 11B, the concave portion 86A and the three projections 98 are provided at the axially central portion (the central portion) of the top surface of the pad main body 136. By caulking (crimping) the projections 98 in the state in which the metal plate 96 is fit with play in the concave portion 86A, the metal plate 96 is fixed to the pad main body 136.

Figure 15A:
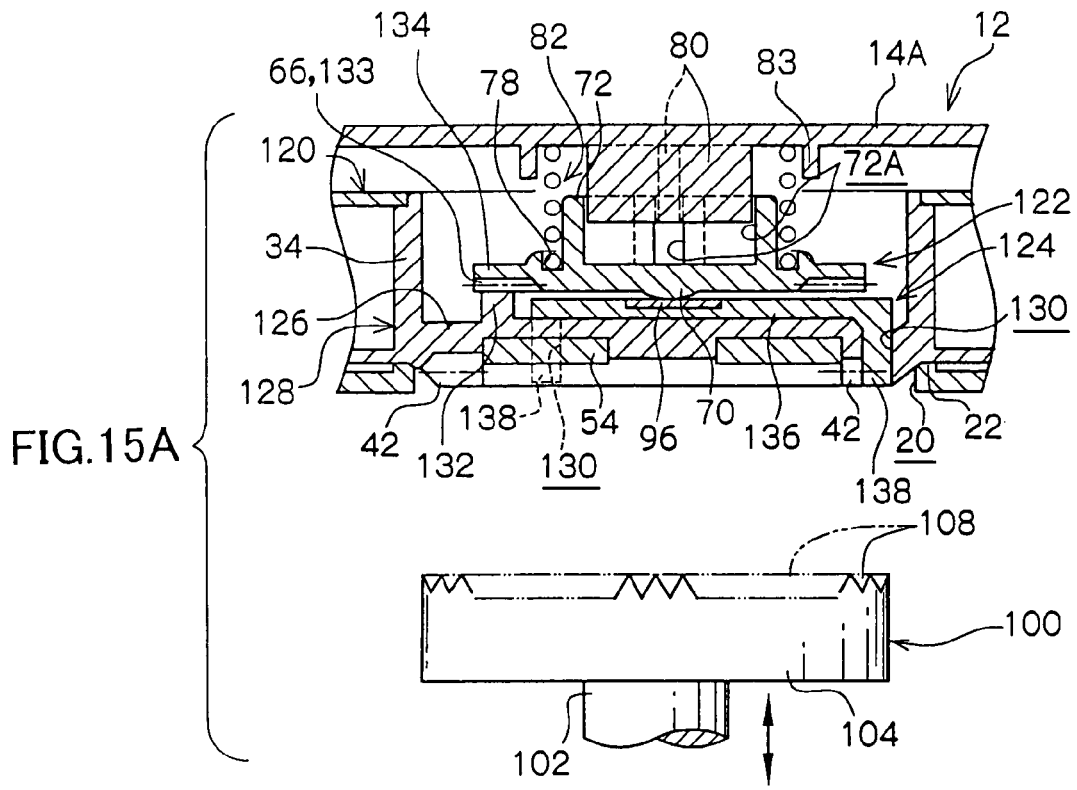
FIGS. 15A and 15B are drawings showing the reel and the braking means which relate to the first modified example and which structure the recording tape cartridge relating to the embodiment of the present invention, where
Figure 15B:
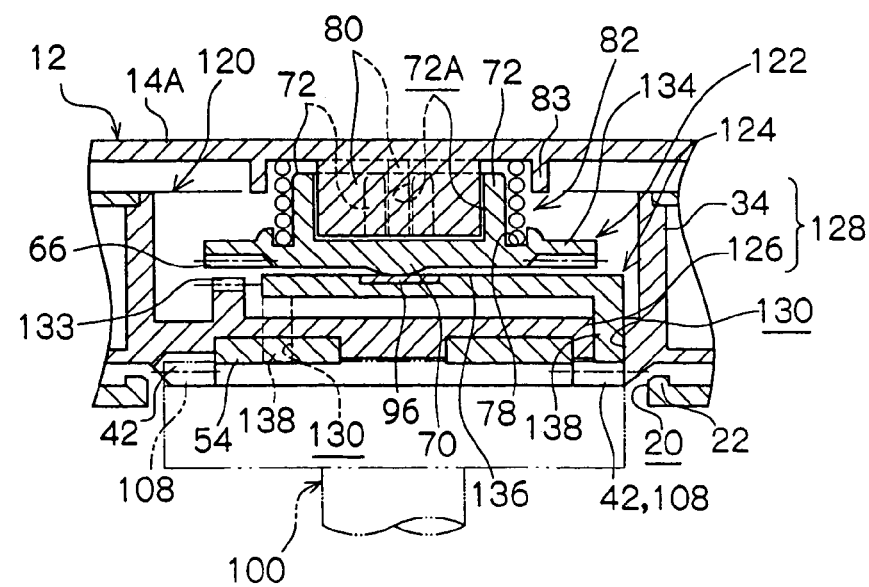

At the above-described release pad 124, in the state in which the leg portions 138 are inserted in respectively different ones of the insert-through holes 130 of the reel 120, the pad main body 136 is positioned between the floor portion 126 and the braking member 122, and the abutment surface 96A of the metal plate 96 always abuts the slide-contact projection 70 of the braking member 122. The bottom surface of the pad main body 136 of the release pad 124 usually abuts the top surface of the floor portion 126 due to the urging force of the compression coil spring 82. In this state, as shown in FIG. 15A, the braking member 122 is positioned at the rotation locking position. On the other hand, accompanying the operation of the driving gear 108 of the rotating shaft 100 meshing with the reel gear 42 (i.e., accompanying the relative movement), the leg portions 138 are pressed by the addenda of the driving gear 108. In this way, as shown in FIG. 15B, the braking member 122 is raised up to the rotation permitting position against the urging force of the compression coil spring 82. Note that the releasing surface 114A (the pressing bolt 112 having the head portion 114) is not provided at the rotating shaft 100 relating to the present first modified example.

In accordance with the structure relating to the present first modified example, effects which are similar to those of the above-described embodiment can be obtained. In particular, the present first modified example is not a structure in which a portion of the clutch member 84 is set within the tubular portion 62A of the braking member 60, as is the previously-described embodiment (i.e., the braking member 122 and the release pad 124 do not overlap in the heightwise direction). Therefore, by inserting the metal plate 96 into the concave portion 86A, the release pad 124 can on the whole be made to be thin, and a large stroke of movement of the braking member 122 can be ensured.

Figure 16A:
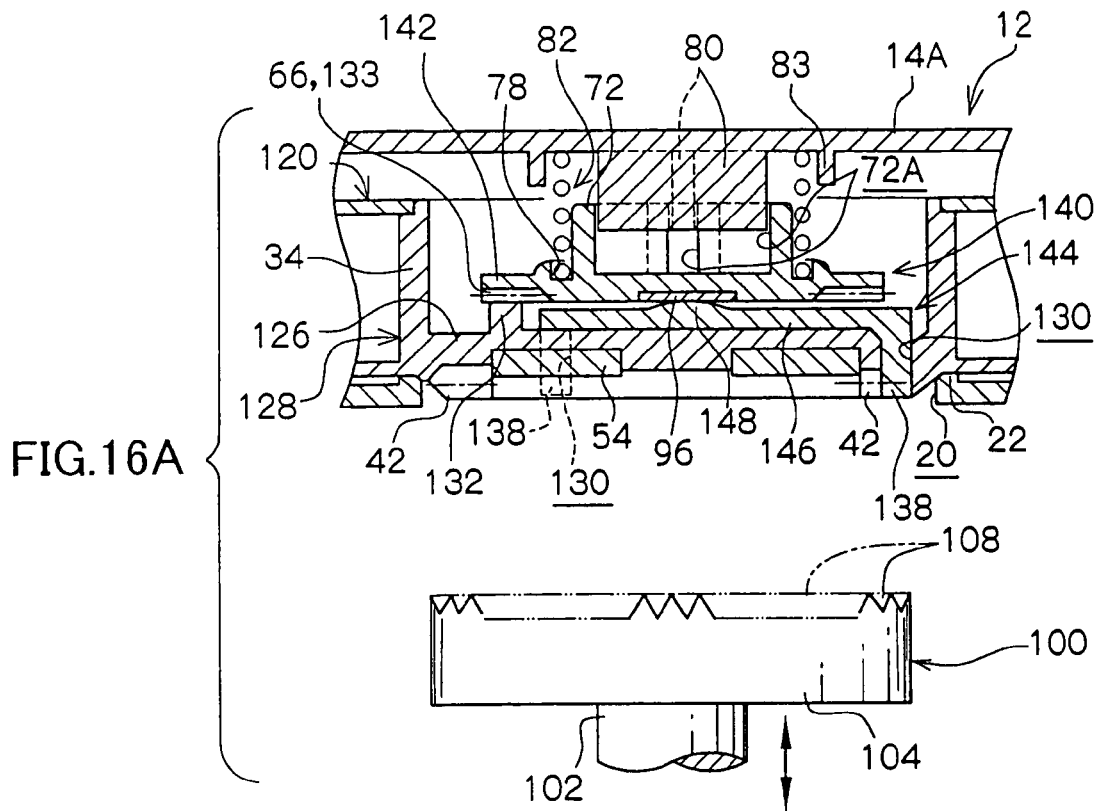
FIGS. 16A and 16B are drawings showing a reel and a braking means which relate to a second modified example and which structure the recording tape cartridge relating to the embodiment of the present invention, where
Figure 16B:
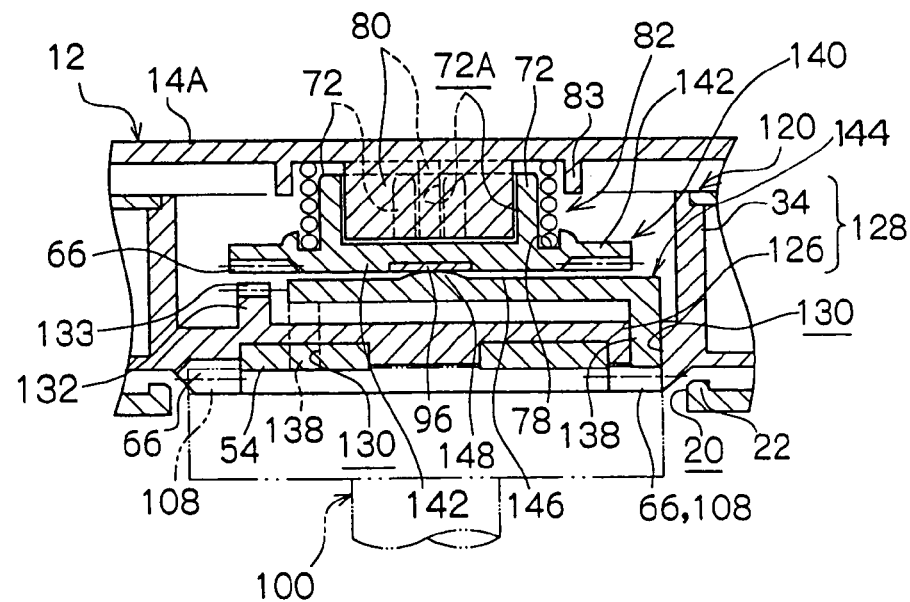

FIG. 16A is a sectional view at a time when a braking member 140 relating to a second modified example is positioned at a rotation locking position. FIG. 16B is a sectional view at a time when the braking member 140 is positioned at a rotation permitting position. The basic structure of the present second modified example is similar to that of the first modified example. The present second modified example differs from the first modified example with regard to the point that the metal plate 96 is fixed to the braking member 140.

The braking member 140 is structured similarly to the braking member 122 relating to the first modified example, except for the points that, at the braking member 140, in place of the slide-contact projection 70, the concave portion 86 and the three projections 98 for caulking (see FIGS. 10A and 10B) are provided at a main body portion 142, and the metal plate 96 is fixedly held thereat in the same way as at the clutch member 84 and the release pad 124. A release pad 144 relating to the second modified example is structured similarly to the release pad 124 relating to the first modified example, except for the point that, instead of the concave portion 86A and the three projections 98 for caulking (crimping), a slide-contact projection 148 is formed integrally by resin molding with the axially central portion (the central portion) of a main body portion 146 of the release pad 144. The slide-contact projection 148 is formed in a substantially convex spherical shape.

In the present second modified example, the metal plate 96 of the braking member 140 and the slide-contact projection 148 of the release pad 144 always abut one another in a state of point-contacting one another due to the urging force of the compression coil spring 82, and the braking member 140 is usually positioned at the rotation locking position as shown in FIG. 16A. Due to the leg portions 138 being pressed by the addenda of the driving gear 108 of the rotating shaft 100 as the driving gear 108 meshes with the reel gear 42, the release pad 144 raises the braking member 140 up to the rotation permitting position against the urging force of the compression coil spring 82.

In accordance with the structure relating to the present second modified example, effects which are similar to those of the above-described embodiment and first modified example can be achieved.

Modified Example of Metal Plate

Next, a modified example of the structure for fixing the metal flat plate will be described. Note that parts and portions which are substantially the same as those of the above-described embodiment (and respective modified examples) are denoted by the same reference numerals, and description thereof will be omitted for convenience.

Figure 17:
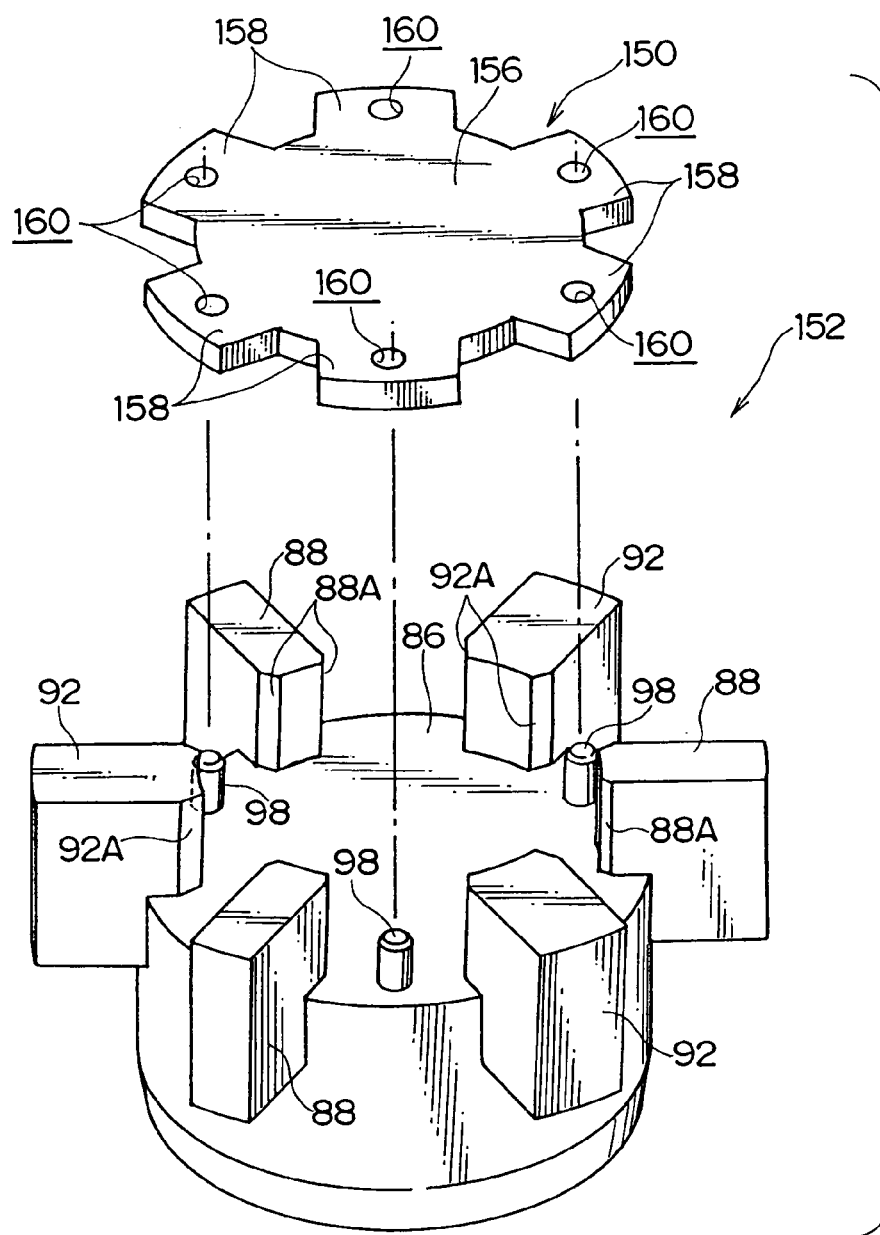
FIG. 17 is an exploded perspective view showing a metal plate and a clutch member which relate to a third modified example and which structure the recording tape cartridge relating to the embodiment of the present invention.

FIG. 17 is an exploded perspective view of a clutch member 152 having a metal plate 150 relating to a third modified example. The clutch member 152 differs from the clutch member 84 relating to the above-described embodiment with regard to the point that the concave portion 86A is not formed at the top end portion of the clutch main body 86. The three projections 98 for caulking project integrally from the top end surface of the clutch main body 86. The projections 98 for caulking are disposed at uniform intervals in the peripheral direction, between respectively different ones of the rotation restricting ribs 88 and the seat ribs 92.

The metal plate 150 is structured by a disc portion 156, and lobe portions 158 which extend outwardly in the radial direction from the outer peripheral portion of the disc portion 156. In the present third modified example, six of the lobe portions 158 are provided radially (at uniform intervals in the peripheral direction), and enter in between respectively different ones of the rotation restricting ribs 88 and the seat ribs 92. At the radial direction inner side edge portions of the respective rotation restricting ribs 88 and seat ribs 92, the corner portions are cut away such that chamfered portions 88A, 92A are formed.

Figure 18:
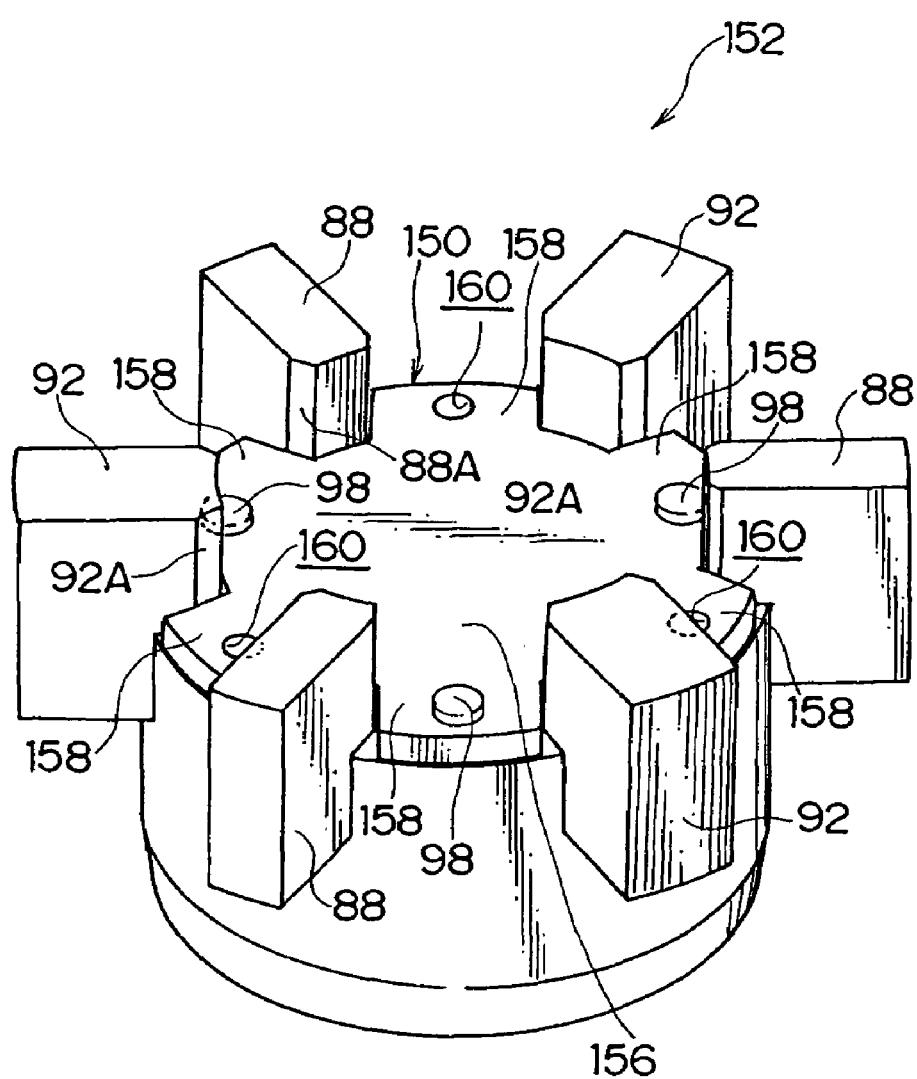
FIG. 18 is a perspective view showing a state in which the metal plate, which relates to the third modified example and structures the recording tape cartridge relating to the embodiment of the present invention, is assembled to the clutch member.

Through holes 160, through which the projections 98 for caulking can be inserted, are formed in the lobe portions 158 so as to pass therethrough along the direction of plate thickness thereof. As shown in FIG. 18, the metal plate 150 is fixed to the clutch member 152 by the projections 98 for caulking (specifically, the portions thereof projecting out further than the top surface of the metal plate 150) being thermally caulked in a state in which the respectively different projections 98 for caulking are engageably inserted through (passed through) three of the through holes 160 which are positioned alternately among the six through holes 160.

The disc portion 156 and the lobe portions 158 having the through holes 160 are formed integrally by the metal plate 150 being punched out from the flat plate member FP by press working using the punch P and the die D, in the same way as the metal plate 96. The top surface of the disc portion 156 is finished to the mirror surface M, and is at the punch P side at the time of punching, and forms an abutment surface 156A which the slide-contact projection 70 of the braking member 60 abuts. In the same way as the abutment surface 96A, the surface roughness of the abutment surface 156A is, in terms of arithmetic mean roughness (Ra) or central line mean roughness ($Ra_{75}$), in the range of 0.01 μm to 0.3 μm, and preferably within the range of 0.01 μm to 0.1 μm.

Figure 19A:
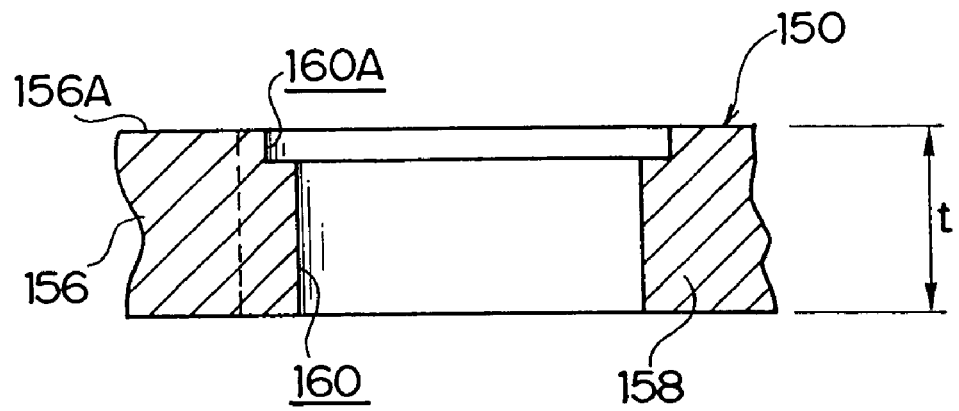
FIGS. 19A and 19B are drawings showing the metal plate which relates to the third modified example and which structures the recording tape cartridge relating to the embodiment of the present invention, where

As shown in FIG. 19A, at the inner edge portions of the through holes 160 at the top side (the abutment surface 156A side) of the lobe portions 158, the corner portions (edges) are crushed at the time of the aforementioned press working, such that counterbore portions 160A are formed. Portions of the projections 98 for caulking, which are melted by the heat at the time of caulking, enter into the counterbore portions 160A, such that the metal plate 150 is strongly fixed to the clutch member 152.

A plate thickness t of the metal plate 150 is in the range of 0.05 mm to 0.7 mm (0.05 mm≦t≦0.7 mm), and preferably is in the range of 0.1 mm≦t≦0.5 mm (0.1 mm≦t≦0.5 mm), and more preferably is in the range of 0.2 mm to 0.3 mm (0.2 mm≦t≦0.3 mm). These ranges of numerical values are set both in order for the metal plate 150 to be made thin, which is necessary to ensure the release stroke of the braking member 60 by the clutch member 152, and in order to prevent the occurrence of warping, which is necessary from the standpoints of ease of assembly and the ensuring of dimensional accuracy, because the metal plate 150 is not set in the concave portion 86A in the present third modified example.

Figure 19B:
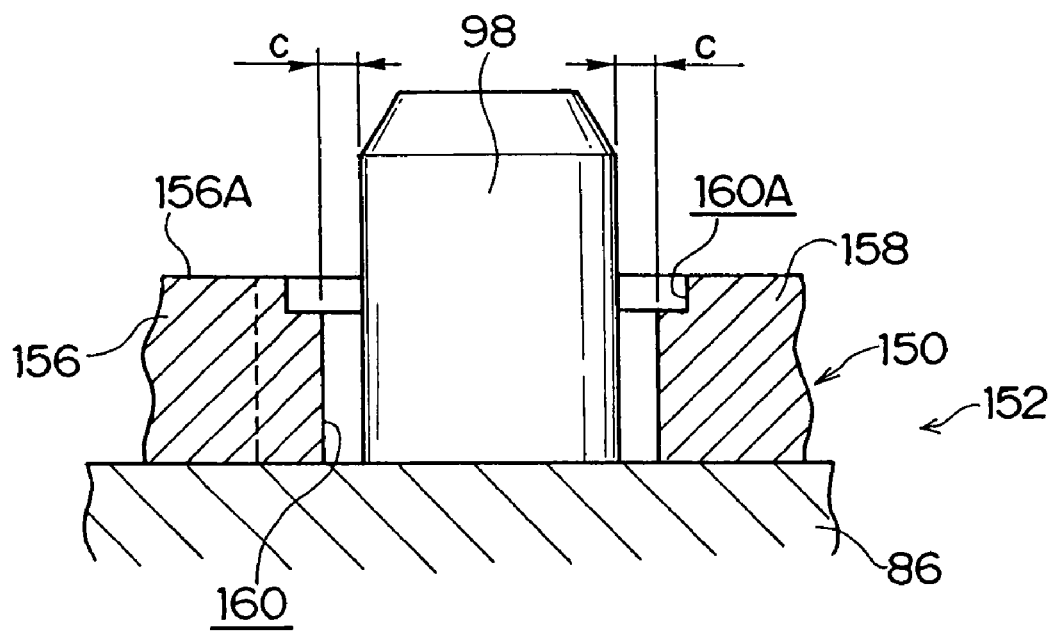

The hole diameter of each through hole 160 is in the range of 0.5 mm to 2.2 mm, and preferably within the range of 0.8 mm to 1.2 mm. A clearance C (see FIG. 19B) at one side between the inner peripheral surface of the through hole 160 and the projection 98 for caulking coaxially inserted through the through hole 160 (as described above, the outer diameter of the projection 98 for caulking is 0.4 mm to 1.8 mm, and preferably 0.5 mm to 1.0 mm), is within the range of 0.05 mm to 0.5 mm.

The height by which the projection 98 for caulking projects from the top end surface of the clutch main body 86 is larger than the plate thickness t of the metal plate 150. The height of projection from the top surface of the metal plate 150 (the abutment surface 156A) in the state after caulking which is shown in FIG. 18 is set to be within the range of 0.03 mm to 2.0 mm. In this way, even if the braking member 60 tilts, the braking member 60 (the slide-contact projection 70) does not interfere with the projections 98 for caulking after they have been caulked.

In the present third modified example, effects which are similar to those of the above-described embodiment can be achieved, except for the effects brought about by the provision of the concave portion 86A. Note that, although the metal plate 150 has a complex configuration and the like, it can be formed by a punching processing of one step (one stroke), and there is no need for bending processing or the like. Therefore, the metal plate 150 is simple and inexpensive.

In the present third modified example, before the metal plate 150 is fixed to the clutch member 152 by the caulking of the projections 98 for caulking, the metal plate 150 is positioned at the clutch member 152 due to the projections 98 for caulking being inserted in the through holes 160 of the lobe portions 158. Therefore, the caulking work is facilitated. Further, because the through hole 160 are formed in all six of the lobe portions 158, aligning of the through holes 160 and the projections 98 for caulking, which would be needed in a case in which the through holes 160 were to be provided in only three of the lobe portions 158, is not carried out. The projections 98 for caulking are reliably inserted in the through holes 160 merely by the respective lobe portions 158 being made to enter in between the rotation restricting ribs 88 and the seat ribs 92. Because positioning of the metal plate 150 with respect to the clutch member 152 is easy, automatic assembly is possible.

The above-described fixing structure for the metal plate 150, in which the projections 98 for caulking are inserted through the through holes 160 before caulking, can be applied to the structure of fixing the metal plate 150 to either the release pad 124 or the braking member 140 relating to the first or the second modified example. In this case, the metal plate 150, which is fixed to the release pad 124 or the braking member 140 which does not have the rotation restricting ribs 88 and the seat ribs 92, does not have the lobe portions 158, and the through holes 160 can merely be formed in the vicinity of the peripheral edge portion. Further, in the structure for fixing the present metal plate 150, the metal plate 150 may be placed in the concave portion 86A from whose floor portion the projections 98 for caulking project, such that the restrictions on the plate thickness of the metal plate 150 are eased.

Figure 20A:
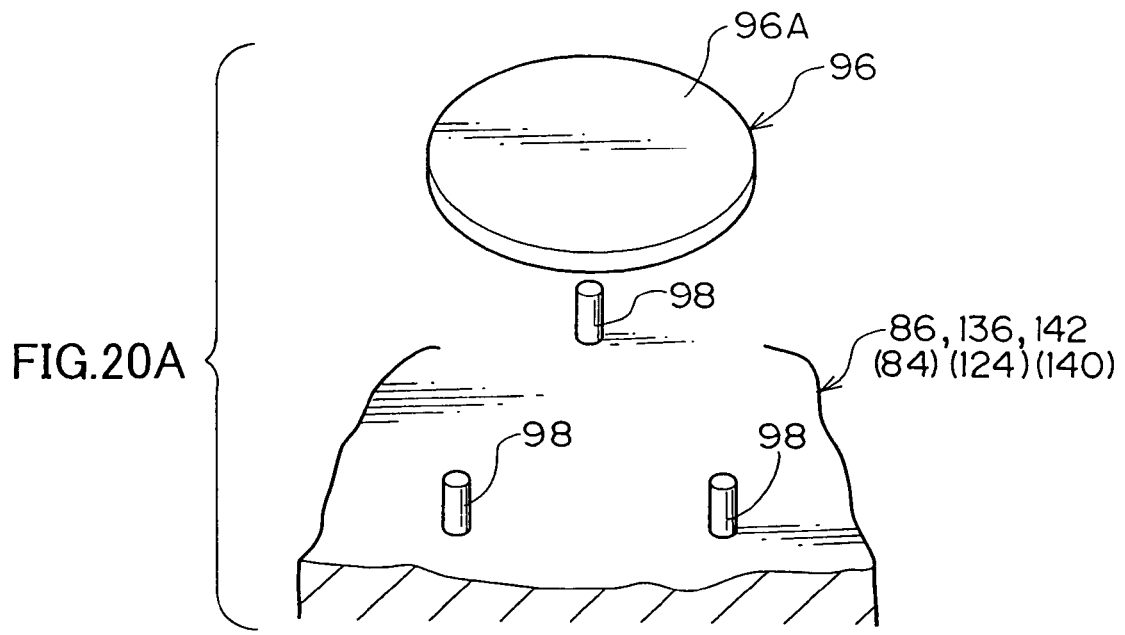
FIGS. 20A and 20B are drawings showing a metal plate fixing structure which relates to a fourth modified example and which structures the recording tape cartridge relating to the embodiment of the present invention, where
Figure 20B:
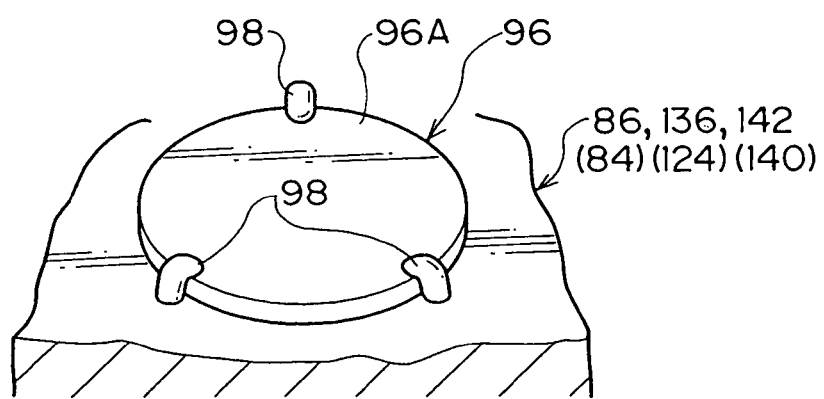
Figure 21A:
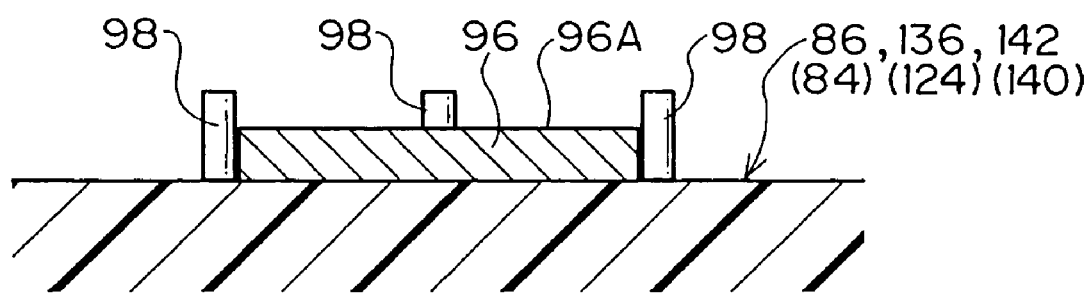
FIGS. 21A and 21B are drawings showing the metal plate fixing structure which relates to the fourth modified example and which structures the recording tape cartridge relating to the embodiment of the present invention, where
Figure 21B:
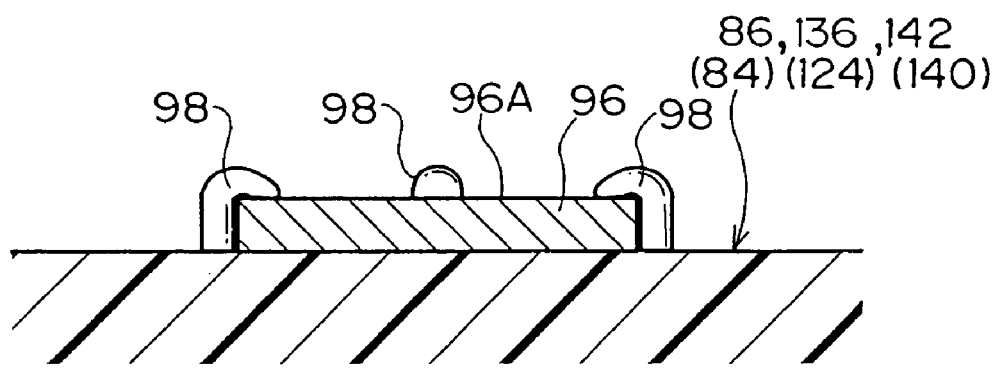
Figure 22:
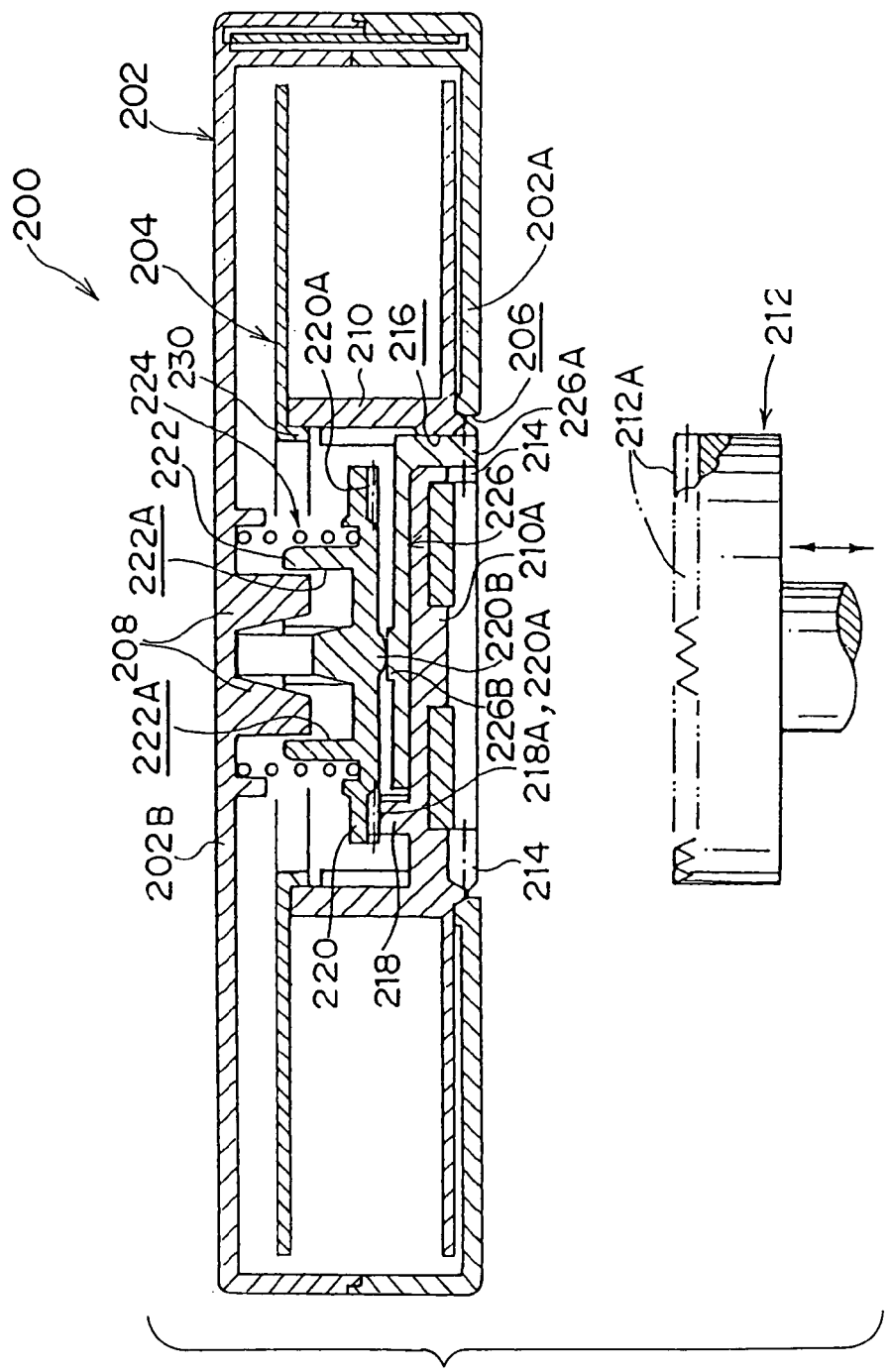
FIG. 22 is a sectional view showing a state in which rotation of a reel is locked in a conventional recording tape cartridge.
Figure 23:
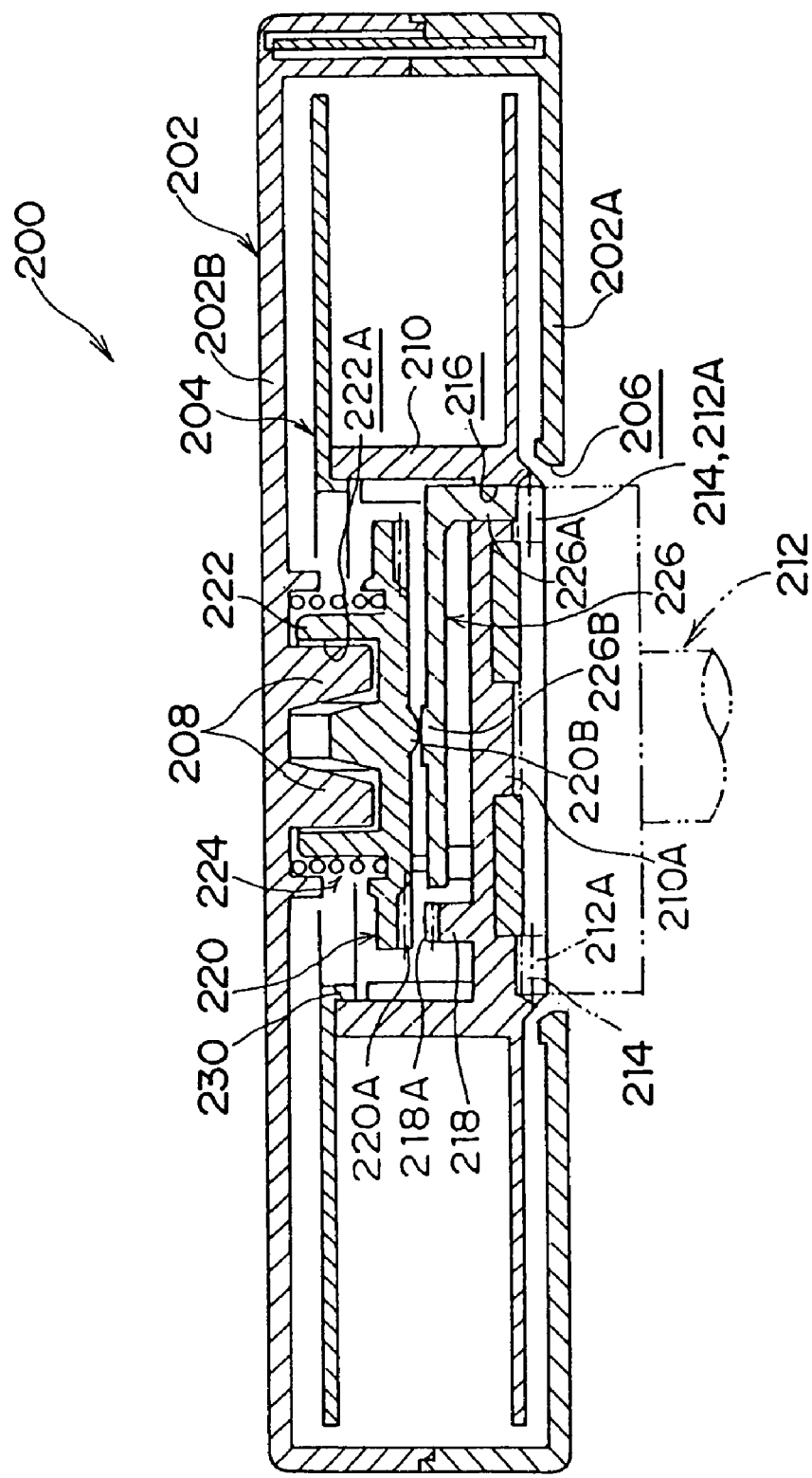
FIG. 23 is a sectional view showing a state in which rotation of the reel is possible in the conventional recording tape cartridge.

FIGS. 20A and 20B are perspective views showing a structure relating to a fourth modified example. FIGS. 21A and 21B are sectional views showing the structure relating to the fourth modified example. As shown in these figures, in the present fourth modified example, the concave portion 86A is not provided at the clutch main body 86, the pad main body 136, or the main body portion 142. The disc-shaped metal plate 96 is fixed to the clutch main body 86 or the like by the projections 98 for caulking being caulked in a state in which the metal plate 96 is set on a flat surface.

In this structure, in order to position the metal plate 96 with respect to the clutch main body 86 or the like before caulking (i.e., in order to restrict positional offset in the surface direction), the three or more projections 98 for caulking are disposed so as to surround the metal plate 96 from a vicinity thereof (i.e., in a state of substantially contacting the metal plate 96). The plate thickness of the metal plate 96 is set in the same way as that of the metal plate 150 relating to the above-described third modified example.

Note that, in the above-described embodiment and respective modified examples, the metal plate 96 is formed in the shape of a disc, or the metal plate 150 has the disc portion 156. However, the present invention is not limited to the same. For example, the metal plate 96 may be formed in the shape of a rectangular plate which is square or the like, or as an equilateral triangular plate shape.

Further, in the above-described embodiment and respective modified examples, the metal plates 96, 150 are formed by punching. However, the present invention is not limited by the method of manufacturing (processing) the metal plate 96 and the like. Further, the present invention is not limited to the structure in which the abutment surface 96A, 156A is finished to a mirror surface before punching, and punching is carried out with the mirror surface M at the punch P side. Further, the material of the metal plate 96 and the like is not limited to stainless steel.

Moreover, although the projections 98 for caulking are thermally caulked in the above-described embodiment and respective modified examples, the present invention is not limited to the same. The method of caulking the projections 98 for caulking may be, for example, caulking by heating by contact with a heat plate or the like, or caulking by heating due to the heat generated by ultrasonic vibrations, or mechanical caulking. Further, the configurations of the projections 98 for caulking are not limited to substantially solid cylindrical. For example, the projections 98 for caulking may be wall-shaped or rectangular column shaped or the like before caulking.

Moreover, in the above-described embodiment and respective modified examples, the structure in which the recording tape cartridge 10 has the leader block 30 is given as an example. However, the present invention is not limited by the configuration of the case 12, the magnetic tape T pull-out structure (the structure of the leader member), the position of the opening 18, the structure for opening and closing the opening 18, or the like. Accordingly, for example, the recording tape cartridge 10 may be structured such that a small, solid-cylindrical leader pin is attached as a leader member to the distal end of the magnetic tape T, or may be structured so as to have a shielding member which opens and closes the opening 18 (a sliding door or the like which moves along a predetermined straight line or arc).

The braking member of the present invention is not limited to the braking members 60, 122, 140 of the above-described embodiment and respective modified examples.

The releasing member of the present invention is not limited to the clutch members 84, 152 and the release pads 124, 144 of the above-described embodiment and respective modified examples.

In addition, the magnetic tape T is used as the recording tape in the above-described embodiment and respective modified examples. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

As described above, the recording tape cartridge relating to the present invention has the excellent effect that wear of the regions of abutment of a braking member and a releasing member at the time when a reel rotates can be prevented with a structure having good produceability.

What is claimed is:

1. A tape cartridge comprising:
   a reel;
   a braking member formed of resin and able to move reciprocatingly at least between a locking position at which the braking member prohibits rotation of the reel, and an unlocking position at which the braking member permits rotation of the reel;
   a releasing member formed of resin and able to engage with the braking member for the reciprocating movement; and
   a metal plate positioned between the braking member and the releasing member, and fixed to one of the braking member and the releasing member by a portion of one of the braking member and the releasing member being crimped, and having an abutment surface which can abut another of the braking member and the releasing member,
   wherein the one of the braking member and the releasing member has a plurality of projections for the crimping which are integrally molded with the one of the braking member and the releasing member; and wherein each of the projections has a portion positioned at a radially outer side of the metal plate, and a portion deformed by the crimping and bent over the top of the abutment surface.

2. The tape cartridge of claim 1, wherein the one of the braking member and the releasing member has a concave portion which accommodates the metal plate.

3. The tape cartridge of claim 2, wherein an outer dimension of the metal plate is smaller than an inner dimension of the concave portion.

4. The tape cartridge of claim 1, wherein the abutment surface is a surface which is mirror surface finished.

5. The tape cartridge of claim 1, wherein the metal plate is formed by punching.

6. The tape cartridge of claim 5, wherein a surface of the metal plate, which surface is positioned at an upstream side with respect to a direction of the punching, is the abutment surface.

7. The tape cartridge of claim 1, further comprising an urging member always urging the braking member toward the locking position.

8. The tape cartridge of claim 1, wherein
   the releasing member can move translationally in a direction of an axis of rotation of the reel, and
   the braking member can move between the locking position and the unlocking position, interlockingly with the translation motion of the releasing member.

9. The tape cartridge of claim 1, further comprising a case rotatably accommodating the reel.

10. The tape cartridge of claim 9, further comprising a tape access opening provided at the case.

11. The tape cartridge of claim 10, wherein
    the case has a front wall portion facing in a cartridge insertion direction, a side wall portion substantially parallel to the cartridge insertion direction, and an inclined wall portion continuous with the front wall portion and the side wall portion and inclined with respect to the cartridge insertion direction, and
    the tape access opening is provided at the inclined wall portion.

* * * * *